(12) United States Patent
Brown et al.

(10) Patent No.: US 9,384,198 B2
(45) Date of Patent: Jul. 5, 2016

(54) AGENCY MANAGEMENT SYSTEM AND CONTENT MANAGEMENT SYSTEM INTEGRATION

(75) Inventors: Derrick Brown, Conyers, GA (US); Roger Blair, Atlanta, GA (US); Steven Finch, Tampa, FL (US); Igor Wolbers, Utrecht (NL); Gerald Taylor, Atlanta, GA (US); Aleksey Cherkasov, Lilburn, GA (US)

(73) Assignee: Vertafore, Inc., Bothell, WA (US)

( * ) Notice: Subject to any disclaimer, the term of this patent is extended or adjusted under 35 U.S.C. 154(b) by 145 days.

(21) Appl. No.: 13/004,572

(22) Filed: Jan. 11, 2011

(65) Prior Publication Data
US 2012/0150919 A1 Jun. 14, 2012

Related U.S. Application Data

(60) Provisional application No. 61/422,090, filed on Dec. 10, 2010.

(51) Int. Cl.
*G06F 17/30* (2006.01)
(52) U.S. Cl.
CPC .... *G06F 17/30082* (2013.01); *G06F 17/30091* (2013.01); *G06F 17/30115* (2013.01)
(58) Field of Classification Search
CPC .................. G06F 17/30076; G06F 17/30079; G06F 17/30294; G06F 17/30563
See application file for complete search history.

(56) References Cited

U.S. PATENT DOCUMENTS

| 3,970,992 A | 7/1976 | Boothroyd et al. |
| 4,346,442 A | 8/1982 | Musmanno |

(Continued)

FOREIGN PATENT DOCUMENTS

| CA | 2646167 A1 | 10/2007 |
| CA | 2649441 A1 | 10/2007 |

(Continued)

OTHER PUBLICATIONS

"Update insurance template according to changes to policy" retrieved from URL=https://www.google.com/?tbm=pts on Sep. 24, 2012, 2 pages.

(Continued)

*Primary Examiner* — Miranda Huang
(74) *Attorney, Agent, or Firm* — Seed IP Law Group PLLC

(57) ABSTRACT

An agency management and content management integration system links agency management system domain entities (such as clients, policies, claims, vendors) to content management system content hierarchical structures (such as client files, policy folders, claims folders, vendor files). End users can quickly navigate to the appropriate content management system structure or structures when working with an entity in the agency management system via button integration. The agency management and content management integration system automatically creates and updates the content management system when changes are made to the agency management system. This may include providing multiple mappings between the entities of the insurance agency management system and content hierarchical structures, a preview of changes to the content hierarchical structures, a testing environment to test the content hierarchical structure changes, and troubleshooting logs resulting from testing of the content hierarchical structure. Also provided are systems to create appropriate initial content management system hierarchical structures when the agency management system already exists, and to update existing structures en masse if desired.

38 Claims, 16 Drawing Sheets

(56) References Cited

U.S. PATENT DOCUMENTS

| | | |
|---|---|---|
| 4,347,568 A | 8/1982 | Giguere et al. |
| 4,359,631 A | 11/1982 | Lockwood et al. |
| 4,383,298 A | 5/1983 | Huff et al. |
| 4,410,940 A | 10/1983 | Carlson et al. |
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,812,859 A | 9/1998 | Kamimaki et al. |
| 5,864,340 A | 1/1999 | Bertram et al. |
| 5,880,724 A | 3/1999 | Bertram et al. |
| 5,968,125 A | 10/1999 | Garrick et al. |
| 6,044,475 A | 3/2000 | Chung et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 | 5/2001 | Immon et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,362,836 B1 | 3/2002 | Shaw et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,393,438 B1 | 5/2002 | Kathrow et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,553,419 B1 | 4/2003 | Ram |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,671,716 B1 | 12/2003 | Diedrichsen et al. |
| 6,766,471 B2 | 7/2004 | Meth |
| 6,795,966 B1 | 9/2004 | Lim et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,000,230 B1 | 2/2006 | Murray et al. |
| 7,010,503 B1 | 3/2006 | Oliver et al. |
| 7,020,779 B1 | 3/2006 | Sutherland |
| 7,028,223 B1 | 4/2006 | Kolawa et al. |
| 7,146,495 B2 | 12/2006 | Baldwin et al. |
| 7,178,110 B2 | 2/2007 | Fujino |
| 7,206,998 B2 | 4/2007 | Pennell et al. |
| 7,266,537 B2 | 9/2007 | Jacobsen et al. |
| 7,296,193 B2 | 11/2007 | Goode et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,457,878 B1 | 11/2008 | Mathiske et al. |
| 7,478,064 B1 | 1/2009 | Nacht |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,711,703 B2 * | 5/2010 | Smolen ............ G06F 17/30348 707/609 |
| 7,725,456 B2 * | 5/2010 | Augustine ......... G06F 17/30581 707/713 |
| 7,757,168 B1 | 7/2010 | Shanahan et al. |
| 7,757,239 B2 | 7/2010 | Beck |
| 7,814,078 B1 | 10/2010 | Forman et al. |
| 7,886,046 B1 | 2/2011 | Zeitoun et al. |
| 7,949,711 B2 | 5/2011 | Chang et al. |
| 8,112,394 B2 | 2/2012 | Shringi et al. |
| 8,146,058 B2 | 3/2012 | Sarkar et al. |
| 8,166,388 B2 | 4/2012 | Gounares et al. |
| 8,266,592 B2 | 9/2012 | Beto et al. |
| 8,285,685 B2 * | 10/2012 | Prahlad ............ G06F 17/30528 707/665 |
| 8,370,403 B2 | 2/2013 | Matsuki |
| 8,375,126 B2 | 2/2013 | Kriewall |
| 8,438,045 B2 | 5/2013 | Erlanger |
| 8,489,921 B2 | 7/2013 | Varadarajan et al. |
| 8,650,043 B1 | 2/2014 | Phillips |
| 8,667,267 B1 | 3/2014 | Garcia et al. |
| 8,825,626 B1 | 9/2014 | Wallace et al. |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0087602 A1 | 7/2002 | Masuda et al. |

(56) References Cited

U.S. PATENT DOCUMENTS

| | | |
|---|---|---|
| 2002/0120474 A1 | 8/2002 | Hele et al. |
| 2002/0120776 A1 | 8/2002 | Eggebraaten et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0101200 A1 | 5/2003 | Koyama et al. |
| 2003/0105813 A1 | 6/2003 | Mizutani |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059740 A1 | 3/2004 | Hanakawa et al. |
| 2004/0128182 A1 | 7/2004 | Pepoon et al. |
| 2004/0133606 A1* | 7/2004 | Miloushev ........ G06F 17/30091 |
| 2004/0186750 A1 | 9/2004 | Surbey et al. |
| 2004/0193455 A1* | 9/2004 | Kellington ........................ 705/4 |
| 2004/0194026 A1 | 9/2004 | Barrus et al. |
| 2004/0220975 A1 | 11/2004 | Carpentier et al. |
| 2004/0230903 A1 | 11/2004 | Elza et al. |
| 2004/0236614 A1 | 11/2004 | Keith |
| 2004/0243969 A1 | 12/2004 | Kamery et al. |
| 2004/0255275 A1 | 12/2004 | Czerwonka |
| 2004/0267578 A1 | 12/2004 | Pearson |
| 2005/0024387 A1 | 2/2005 | Ratnakar et al. |
| 2005/0033988 A1 | 2/2005 | Chandrashekhar et al. |
| 2005/0071203 A1 | 3/2005 | Maus |
| 2005/0080804 A1 | 4/2005 | Bradshaw, Jr. et al. |
| 2005/0097061 A1 | 5/2005 | Shapiro et al. |
| 2005/0137928 A1 | 6/2005 | Scholl et al. |
| 2005/0144195 A1 | 6/2005 | Hesselink et al. |
| 2005/0233287 A1 | 10/2005 | Bulatov et al. |
| 2006/0047540 A1 | 3/2006 | Hutten et al. |
| 2006/0059418 A1 | 3/2006 | Elkady |
| 2006/0100912 A1 | 5/2006 | Kumar et al. |
| 2006/0184632 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0016829 A1 | 1/2007 | Subramanian et al. |
| 2007/0061154 A1 | 3/2007 | Markvoort et al. |
| 2007/0067772 A1 | 3/2007 | Bustamante |
| 2007/0130346 A1 | 6/2007 | Xie et al. |
| 2007/0146823 A1 | 6/2007 | Borchers et al. |
| 2007/0160070 A1 | 7/2007 | Buchhop et al. |
| 2007/0186066 A1 | 8/2007 | Desai et al. |
| 2007/0186214 A1 | 8/2007 | Morgan |
| 2007/0233880 A1 | 10/2007 | Nieh et al. |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov |
| 2008/0002830 A1 | 1/2008 | Cherkasov et al. |
| 2008/0010542 A1 | 1/2008 | Yamamoto et al. |
| 2008/0040690 A1 | 2/2008 | Sakai |
| 2008/0086499 A1 | 4/2008 | Wefers et al. |
| 2008/0091846 A1 | 4/2008 | Dang |
| 2008/0120602 A1 | 5/2008 | Comstock et al. |
| 2008/0243897 A1* | 10/2008 | Petri ............................ 707/102 |
| 2009/0007077 A1 | 1/2009 | Musuvathi et al. |
| 2009/0055242 A1 | 2/2009 | Rewari et al. |
| 2009/0119133 A1 | 5/2009 | Yeransian et al. |
| 2009/0199160 A1 | 8/2009 | Vaitheeswaran et al. |
| 2009/0271779 A1 | 10/2009 | Clark |
| 2009/0287746 A1* | 11/2009 | Brown ......................... 707/203 |
| 2009/0328171 A1 | 12/2009 | Bayus et al. |
| 2010/0060926 A1 | 3/2010 | Smith et al. |
| 2010/0064230 A1 | 3/2010 | Klawitter et al. |
| 2010/0064258 A1 | 3/2010 | Gorczowski et al. |
| 2010/0064375 A1 | 3/2010 | Gorczowski et al. |
| 2010/0076993 A1 | 3/2010 | Klawitter et al. |
| 2010/0091317 A1 | 4/2010 | Williams et al. |
| 2010/0161616 A1 | 6/2010 | Mitchell |
| 2010/0179883 A1 | 7/2010 | Devolites |
| 2010/0191785 A1 | 7/2010 | Serlet et al. |
| 2010/0199263 A1 | 8/2010 | Clee et al. |
| 2010/0235392 A1 | 9/2010 | McCreight et al. |
| 2011/0021250 A1 | 1/2011 | Ickman et al. |
| 2011/0088014 A1 | 4/2011 | Becker et al. |
| 2011/0119574 A1* | 5/2011 | Rogers et al. .................. 715/239 |
| 2011/0145037 A1 | 6/2011 | Domashchenko et al. |
| 2011/0153560 A1 | 6/2011 | Bryant et al. |
| 2011/0161375 A1 | 6/2011 | Tedder et al. |
| 2011/0173153 A1 | 7/2011 | Domashchenko et al. |
| 2011/0184689 A1 | 7/2011 | Awedikian et al. |
| 2011/0184766 A1 | 7/2011 | Virdhagriswaran |
| 2011/0270975 A1 | 11/2011 | Troup |
| 2011/0276875 A1 | 11/2011 | McCabe et al. |
| 2011/0283177 A1 | 11/2011 | Gates et al. |
| 2012/0222014 A1 | 8/2012 | Peretz et al. |
| 2012/0232934 A1 | 9/2012 | Zhang et al. |
| 2012/0271657 A1 | 10/2012 | Anderson et al. |
| 2013/0024418 A1 | 1/2013 | Sitrick et al. |
| 2013/0066901 A1 | 3/2013 | Marcelais et al. |
| 2013/0073942 A1 | 3/2013 | Cherkasov |
| 2013/0080760 A1 | 3/2013 | Li et al. |
| 2013/0152047 A1 | 6/2013 | Moorthi et al. |
| 2013/0290786 A1 | 10/2013 | Artzi et al. |
| 2014/0040867 A1 | 2/2014 | Wefers et al. |
| 2014/0358938 A1 | 12/2014 | Billmaier et al. |
| 2015/0100552 A1 | 4/2015 | Malis et al. |

FOREIGN PATENT DOCUMENTS

| | | |
|---|---|---|
| CA | 2761405 A1 | 6/2012 |
| CA | 2733857 A1 | 9/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| JP | 11-143567 A | 5/1999 |
| JP | 11-296452 A | 10/1999 |
| WO | 01/95093 A2 | 12/2001 |
| WO | 2004/088543 A1 | 10/2004 |
| WO | 2007/120771 A2 | 10/2007 |
| WO | 2007/120772 A2 | 10/2007 |
| WO | 2007/120773 A2 | 10/2007 |
| WO | 2007/120774 A2 | 10/2007 |
| WO | 2008/049871 A1 | 5/2008 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |
| WO | 2013/072764 A2 | 5/2013 |

OTHER PUBLICATIONS

Anderson et al., "Overlaying Images in Automated Insurance Policy Form Generation," Amendment filed Jan. 11, 2013 for U.S. Appl. No. 13/089,886, 15 pages.

Anderson et al., "Overlaying Images in Automated Insurance Policy Form Generation," Office Action mailed Oct. 11, 2012 for U.S. Appl. No. 13/089,886, 9 pages.

Zhang et al., "Agency Management System and Content Management System Integration," U.S. Appl. No. 61/422,090, filed Dec. 10, 2010, 54 pages.

Zhang et al., "Automated Insurance Policy Form Generation and Completion," Amendment filed Oct. 2, 2012, for U.S. Appl. No. 13/046,501, 18 pages.

Zhang et al., "Automated Insurance Policy Form Generation and Completion," Office Action mailed Jun. 20, 2012 for U.S. Appl. No. 13/046,501, 22 pages.

"Adobe Introduces Adobe Acrobat 3.0 Software," *PR Newswire*, Jun. 3, 1996, 3 pages.

"CoreData Inc. Announces Technology and Marketing Agreement with MobileStar Network Corp.," *Business Wire*, Aug. 26, 1998, 2 pages.

(56) References Cited

OTHER PUBLICATIONS

"CoreData Offers E-mail Connectivity for RemoteWorx," Newsbytes News Network, Sep. 18, 1998, 1 page.
"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.
"Internet lifts servers to 64 bits," *Electronic Engineering Times*, Dec. 23, 1996, 3 pages.
"NotesPlusPlus," Feb. 25, 2006, retrieved from http://web.archive.org/web/20060225020405/http://www.sharewareconnection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire*, Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News*, Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Snodgrass et al., "Temporal Databases," IEEE Computer, Sep. 1986, pp. 35-42.
"AMS Real-Time Getting Started Guide," AMS Services, Vertafore, Inc., 16 pages, 2008.
"VERITAS Replication Exec version 3.1 for Windows," Administrator's Guide, pp. i-20, 49-68, and 119-160, Dec. 2004.
Announcement, "Coming Attraction, AMS Invites you to a Special Sneak Preview," AMS Services, 1 page, Aug. 1, 2008.
Brochure, "AMS 360—Business Growth. Productivity. Proven Technology.," Vertafore, Inc., 8 pages, 2008.
Brown et al., "Agency Management System and Content Management System Integration," U.S. Appl. No. 61/422,090, filed Dec. 10, 2010, 54 pages.
Bryant et al., "Apparatus, Method and Article to Manage Electronic or Digital Documents in a Networked Enviornment," Amendment filed May 11, 2012, in U.S. Appl. No. 12/641,843, 24 pages.
Bryant et al., "Apparatus, Method and Article to Manage Electronic or Digital Documents in a Networked Enviornment," Amendment filed Sep. 19, 2012, in U.S. Appl. No. 12/641,843, 23 pages.
Bryant et al., "Apparatus, Method and Article to Manage Electronic or Digital Documents in a Networked Enviornment," Final Rejection mailed Jul. 19, 2012, in U.S. Appl. No. 12/641,843, 17 pages.
Bryant et al., "Apparatus, Method and Article to Manage Electronic or Digital Documents in a Networked Enviornment," Non-Final Office Action mailed Feb. 14, 2012, in U.S. Appl. No. 12/641,843, 15 pages.
Corriveau et al., "AMS Portal Server: Bridging the Gap Between Web Presentation and the Back Office," White Paper, AMS Services, 13 pages, 2008.
Snyder et al., "Apparatus, Method and Article to Automate and Manage Communications in a Networked Enviornment," U.S. Appl. No. 13/451,139, filed Apr. 19, 2012, 70 pages.
Snyder et al., "Apparatus, Method and Article to Automate and Manage Communications to Multiple Entities in a Networked Enviornment," U.S. Appl. No. 13/451,168, filed Apr. 19,2012, 82 pages.
Snyder et al., "Apparatus, Method and Article to Automate and Manage Electronic Documents in a Networked Enviornment," Office Action mailed Feb. 5, 2013, for U.S. Appl. No. 13/451,136, 22 pages.
Snyder et al., "Apparatus, Method and Article to Automate and Manage Electronic Documents in a Networked Enviornment," U.S. Appl. No. 13/451,136, filed Apr. 19, 2012, 80 pages.
Snyder et al., "Apparatus, Method and Srticle to Provide an Insurance Workflow Management System," U.S. Appl. No. 13/598,297, filed Aug. 29, 2012, 86 pages.
Tedder et al., "Systems, Methods and Articles for Template Based Generation of Markup Documents to Access Back Office Systems," Amendment filed May 3, 2012, in U.S. Appl. No. 12/647,235, 16 pages.
Tedder et al., "Systems, Methods and Articles for Template Based Generation of Markup Documents to Access Back Office Systems," Amendment filed Sep. 10, 2012, in U.S. Appl. No. 12/647,235, 21 pages.
Tedder et al., "Systems, Methods and Articles for Template Based Generation of Markup Documents to Access Back Office Systems," Final Office Action mailed Jul. 10, 2012, in U.S. Appl. No. 12/647,235, 20 pages.
Tedder et al., "Systems, Methods and Articles for Template Based Generation of Markup Documents to Access Back Office Systems," Non-Final Office Action mailed Feb. 3, 2012, in U.S. Appl. No. 12/647,235, 20 pages.
Alvarez, "Bit Level Comparator Systems and Methods," U.S. Appl. No. 14/101,905, filed Dec. 10, 2013, 57 pages.
Sinyagin et al., "Integration Testing Method and System for Web Services," U.S. Appl. No. 14/104,749, filed Dec. 12, 2013, 63 pages.
Batrouni et al., "Method and System of Assessing Risk Associated With Users Based at Least in Part on Online Presence of the User," U.S. Appl. No. 14/630,509, filed Feb. 24, 2015, 71 pages.
Srivastava et al., "Automated Software Testing Using Metahurestic Technique Based on an Ant Colony Optimization," International Symposium on Electronic System Design, Bhubaneswar, Dec. 20-22, 2010, 7 pages.
Hegarty et al., "Ambient Intelligent Mobile Persistent Browsing Experience (AIMPBE): Seamless Session Browsing Experiences across Heterogeneous Devices using Sensors," Proceedings of the 9th Annual Post-Graduate Symposium on the Convergence of Telecommunications, Networking and Broadcasting (PGNET 2008), Liverpool, UK, Jun. 2008, 6 pages.
McDowell, "Performance Testing of Web Application Components Using Image Differentiation," U.S. Appl. No. 14/926,465, filed Oct. 29, 2015, 44 pages.
Song et al., "Browser Session Preservation and Migration," 2002, 2 pages.
Song et al., "Browser State Repository Service," *Lecture Notes in Computer Science 2414—Pervasive Computing*, pp. 253-266, 2002.

\* cited by examiner

AGENCY MANAGEMENT SYSTEM AND CONTENT MANAGEMENT SYSTEM INTEGRATION

BACKGROUND

1. Technical Field

This disclosure generally relates to data services, and particularly to system integration services.

2. Description of the Related Art

Insurance agency management systems are specialized to handle the domain of insurance business processes. Content management systems are specialized to handle content and workflow. Each of these systems is useful to an insurance agency and many agencies choose to operate both types of systems. There are many insurance business activities that would benefit from interaction with both the agency management system and the content management system (for example, printing out an insurance application for an insurance carrier and saving a copy for the agency's records). Often this involves entering information in both systems and learning to navigate in the two systems. As standalone applications, this creates a burden of work for the user who has to make sure to precisely enter information into both systems and in the correct location in both of the systems. Because of the flexibility of content management systems and complexity of agency management systems, this can be a very tedious and time consuming task that is prone to human error, resulting in a cost to the business.

BRIEF SUMMARY

The agency management and content management integration system is a system which provides easy navigation, linking, and indexing with automatic content structure creation.

When an agency has both an agency management system and a content management system, it is advantageous to integrate these programs so that the user has to copy less data by hand (which is time consuming and prone to error and omission). Integration may also allow the users to quickly navigate between the agency management system and the content management system. Integration may additionally provide for the creation of content structures before there is a need to use the content structure. This may advantageously allow a user to immediately organize content and skip the content structure creation phase of their work. This may be especially valuable if the particular workflow does not start in the agency management system. By automatically creating content structures in a hierarchical fashion, the agency can deploy a unified organization structure that is enforced automatically across the organization. By providing an external integration, the content management system and agency management systems can be developed independently, retaining the benefits of specialization, while the integration pulls the two parts together.

A computer-implemented method may be summarized as including receiving information defining entities of an insurance agency management system; receiving content structure of a content management system; receiving mapping data indicative of mappings between the entities of the insurance agency management system and the content structure; automatically generating a data structure based on the mappings; storing the content structure in the data structure corresponding to the mappings; and automatically synchronizing with changes of the entities of the insurance agency management system, the synchronizing based on information indicative of the changes of the entities of the insurance agency management system.

The synchronizing may include receiving information indicative of changes of the entities of the insurance agency management system; automatically comparing at least one of a number of current attributes of the data structure and at least one of a number of current attributes of the content structure stored in the data structure; and automatically updating, based on the comparing, at least one of the current attributes of the data structure and the current attributes of the content structure stored in the data structure to correspond to the received changes.

The receiving information indicative of changes of the entities may occur automatically on a periodic or nonperiodic (aperiodic) basis without requesting the information indicative of changes of the entities. Synchronizing with changes of the entities of the insurance agency management system may occur at an initial generation of the data structure corresponding to the mappings. The automatically generating a data structure based on the mappings may include generating a hierarchical data structure corresponding to a hierarchical business structure defined by the mapping data.

The computer-implemented method may further include, after initial generation of the data structure, displaying a number of interactive graphical user interface elements operable to trigger automatically performing at least one of: opening the content structure or the data structure for viewing or editing, linking the content structure or the data structure to other content structures or entities, indexing the content structure or the data structure, or entering at least some of the mapping data.

The insurance agency management system, after initial generation of the data structure, may automatically provide information indicative of changes of the entities upon the changes occurring or on a periodic or nonperiodic (aperiodic) basis and wherein the automatically synchronizing may include automatically comparing at least one of a number of current attributes of the data structure and at least one of a number of current attributes of the content structure stored in the data structure to the provided information indicative of the changes; and automatically updating, based on the comparing, at least one of the current attributes of the data structure and the current attributes of the content structure stored in the data structure to correspond to the provided information indicative of the changes.

The entities may include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity. The changes of the entities may be at least one of: adding entities, changes to relationships between the entities, changes to a hierarchical structure defining the entities, or changes to attributes of the entities.

The computer-implemented method may further include automatically organizing the content structure based on entity criteria including at least one of: insurance business unit, insurance coverage type, agency number, customer line of business, policy type of business, policy type, submission type.

A system may be summarized as including a computer processor; and a non-transitory memory communicatively coupled to the computer processor having computer-executable instructions stored thereon that when executed by the computer processor cause the computer processor to perform: receiving information defining entities of an insurance agency management system; receiving content structure of a content management system; receiving mapping data indicative of mappings between the entities of the insurance agency management system and the content structure; automatically generating a data structure based on the mappings; storing the content structure in the data structure corresponding to the mappings; and automatically synchronizing with changes of the entities of the insurance agency management system, the synchronizing based on information indicative of the changes of the entities of the insurance agency management system.

The synchronizing may include receiving information indicative of changes of the entities of the insurance agency management system; automatically comparing at least one of a number of current attributes of the data structure and at least one of a number of current attributes of the content structure stored in the data structure; and automatically updating, based on the comparing, at least one of the current attributes of the data structure and the current attributes of the content structure stored in the data structure to correspond to the received changes. The receiving information indicative of changes of the entities may occur automatically on a periodic or aperiodic basis without requesting the information indicative of changes of the entities. Synchronizing with changes of the entities of the insurance agency management system may occur at an initial generation of the data structure corresponding to the mappings. The automatically generating a data structure based on the mappings may include generating a hierarchical data structure corresponding to a hierarchical business structure defined by the mapping data.

The computer-executable instructions, when executed by the computer processor, after initial generation of the data structure, may further configure the computer processor to display a number of interactive graphical user interface elements operable to trigger automatically performing at least one of: opening the content structure or the data structure for viewing or editing, linking the content structure or the data structure to other content structures or entities, indexing the content structure or the data structure, or entering at least some of the mapping data.

The insurance agency management system may be configured to, after initial generation of the data structure, automatically provide information indicative of changes of the entities upon the changes occurring or on a periodic or nonperiodic (aperiodic) basis and wherein the automatically synchronizing may include automatically comparing at least one of a number of current attributes of the data structure and at least one of a number of current attributes of the content structure stored in the data structure to the provided information indicative of the changes; and automatically updating, based on the comparing, at least one of the current attributes of the data structure and the current attributes of the content structure stored in the data structure to correspond to the provided information indicative of the changes.

The entities may include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity. The changes of the entities may be at least one of: adding entities, changes to relationships between the entities, changes to a hierarchical structure defining the entities, or changes to attributes of the entities.

The computer-executable instructions, when executed by the computer processor, may further configure the computer processor to automatically organize the content structure based on entity criteria including at least one of: insurance business unit, insurance coverage type, agency number, customer line of business, policy type of business, policy type, submission type.

At least one non-transitory computer-readable medium may be summarized as one that stores instructions that when executed by at least one computer system cause the at least one computer system to perform: receiving information defining entities of an insurance agency management system; receiving content structure of a content management system; receiving mapping data indicative of mappings between the entities of the insurance agency management system and the content structure; automatically generating a data structure based on the mappings; storing the content structure in the data structure corresponding to the mappings; and automatically synchronizing with changes of the entities of the insurance agency management system, the synchronizing based on information indicative of the changes of the entities of the insurance agency management system.

The synchronizing may include receiving information indicative of changes of the entities of the insurance agency management system; automatically comparing at least one of a number of current attributes of the data structure and at least one of a number of current attributes of the content structure stored in the data structure; and automatically updating, based on the comparing, at least one of the current attributes of the data structure and the current attributes of the content structure stored in the data structure to correspond to the received changes.

The receiving information indicative of changes of the entities may occur automatically on a periodic basis without requesting the information indicative of changes of the entities. Synchronizing with changes of the entities of the insurance agency management system may occur at an initial generation of the data structure corresponding to the mappings. The automatically generating a data structure based on the mappings may include generating a hierarchical data structure corresponding to a hierarchical business structure defined by the mapping data. The computer-executable instructions, when executed by the at least one computer system, may further cause the at least one computer system to display a number of interactive graphical user interface elements operable to trigger automatically performing at least one of: opening the content structure or the data structure for viewing or editing, linking the content structure or the data structure to other content structures or entities, indexing the content structure or the data structure, or entering at least some of the mapping data.

The computer-executable instructions, when executed by the at least one computer system, may further cause the at least one computer system to, after initial generation of the data structure, cause the insurance agency management system to automatically provide information indicative of changes of the entities upon the changes occurring or on a periodic or nonperiodic (aperiodic) basis and wherein the automatically synchronizing includes automatically comparing at least one of a number of current attributes of the data structure and at least one of a number of current attributes of the content structure stored in the data structure to the provided information indicative of the changes; and automatically updating, based on the comparing, at least one of the current attributes of the data structure and the current attributes of the content structure stored in the data structure to correspond to the provided information indicative of the changes.

The entities may include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity. The changes of the entities may be at least one of: adding entities, changes to relationships between the entities, changes to a hierarchical structure defining the entities, or changes to attributes of the entities. The computer-executable instructions, when executed by the at least one computer system, may further cause the at least one computer system to automatically organize the content structure based on entity criteria including at least one of: insurance business unit, insurance coverage type, agency number, customer line of business, policy type of business, policy type, submission type.

A system may be summarized as including at least one computer processor; and a non-transitory memory communicatively coupled to the computer processor having computer-executable instructions stored thereon that when executed by the computer processor cause the at least one computer processor to: link entities of an insurance agency management system to content hierarchical structures of a content management system; automatically provide information indicative of changes of an insurance agency business unit upon the changes occurring or on a periodic or nonperiodic (aperiodic) basis; and automatically synchronize a content management system content hierarchical structure related to the insurance agency business unit with the changes to the insurance agency business unit.

The computer-executable instructions may further cause the at least one computer processor to: automatically compare at least one current attribute of a data structure for the insurance agency business unit of the insurance agency management system to an attribute of content related to the insurance agency business unit stored in the content management system content hierarchical structures. The information indicative of changes may be automatically provided by the insurance agency management system. The computer-executable instructions may further cause the at least one computer processor to: automatically provide information indicative of changes to content of an insurance policy; and automatically update content management system content hierarchical structures based on the information indicative of changes to content of the insurance policy. The information indicative of changes to content of the insurance policy may be automatically provided by the content management system. The computer-executable instructions may further cause the at least one computer processor to link the entities of the insurance agency management system to the content hierarchical structures of the content management system as an initial process before any of the information indicative of changes is provided.

The computer-executable instructions may further cause the at least one computer processor to: provide a preview of changes to the content hierarchical structure; provide a testing environment to test the content hierarchical structure changes; provide troubleshooting logs resulting from testing of the content hierarchical structure changes; and link the entities of the insurance agency management system to content hierarchical structures of the content management system by providing multiple mappings between the entities of the insurance agency management system and the content hierarchical structures.

The computer-executable instructions may further cause the at least one computer processor to provide an interface for a user to manually trigger a synchronization of the content management system content hierarchical structure related to the insurance agency business unit with the changes to the insurance agency business unit.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
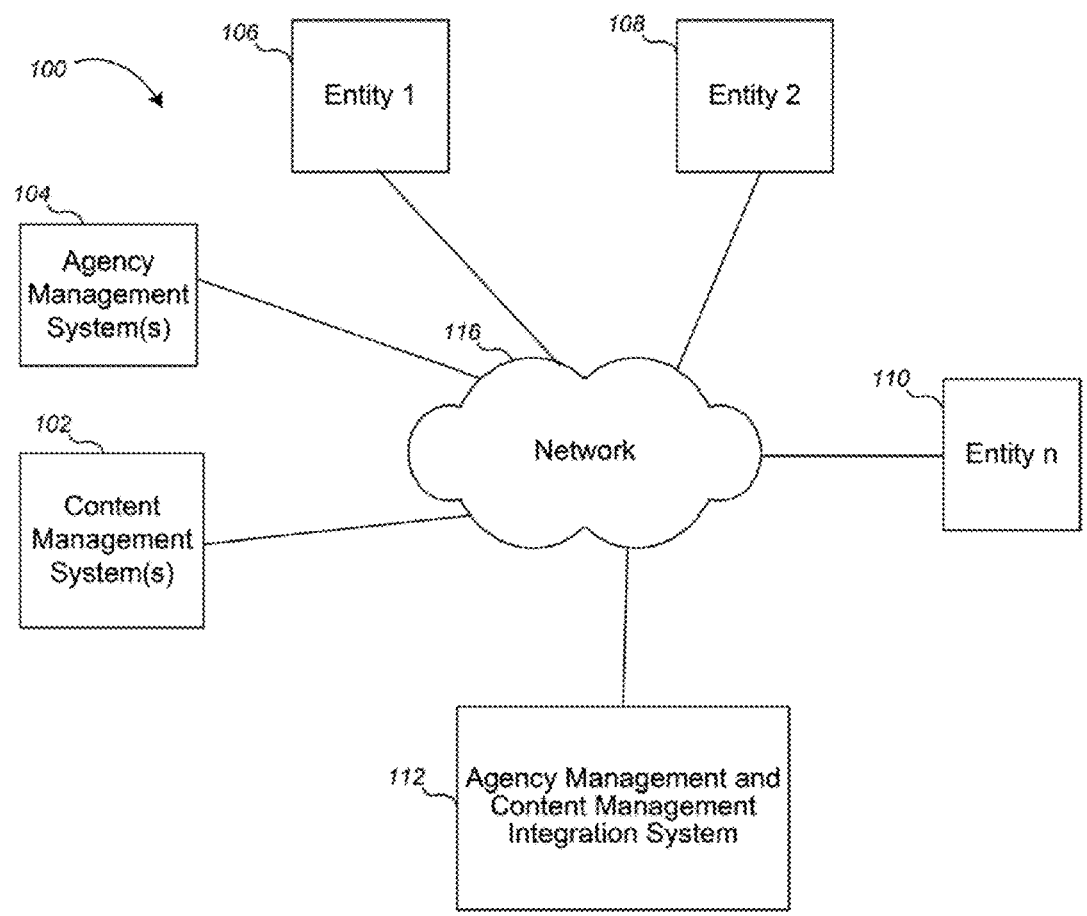
FIG. 1 is a system diagram of a networked environment, in which systems, devices and methods for agency management and content management integration may be a part, or in which they may be implemented, according to one illustrated embodiment.

FIG. 1 is a system diagram of a networked environment, in which systems, devices and methods for agency management and content management integration may be a part, or in which they may be implemented, according to one illustrated embodiment.

The networked environment 100 may include a plurality of entities (e.g., insurance entities), entity 1 106, entity 2 108, and entity n 110; one or more agency management systems 104; one or more content management systems 102; and an agency management and content management integration system 112. Entity 1 106, entity 2 108, entity n 110, the one or more agency management systems 104, the one or more content management systems 102 and the agency management and content management integration system 112 may all be communicatively coupled via a network 116. Alternatively, one or more of the systems or devices may be located on a single system and/or at a single physical location. Additional systems and devices may also be present, but are not illustrated for clarity of presentation.

The network 116 may be any computer network, telecommunications network or combination of telecommunications and computer networks that enables communication between the various systems and entities connected to the network 116 shown in FIG. 1. Entity 1 106, entity 2 108 entity n 110, the one or more agency management systems 104, the one or more content management systems 102, and the agency management and content management integration system 112 may be additionally or optionally linked by one or more other communication links or networks that comprise network 116. For example, a communications network of network 116 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various entities and systems shown in FIG. 1.

The network 116 may comprise connections to entity 1 106, entity 2, 108, entity n 110, the one or more agency management systems 104, and the one or more content management systems 102 such that the agency management and content management integration system 112 may provide integration of the agency management system(s) 104 and content management system(s) 102, and may itself represent multiple interconnected networks. For instance wired and wireless enterprise-wide computer networks, intranets, extranets, and/or the Internet may be included in or comprise a part of network 116. Embodiments may include various types of communication networks including other telecommunications networks, cellular networks, paging networks, and other mobile networks. There may be any variety of computers, switching devices, routers, bridges, firewalls, edge devices, multiplexers, phone lines, cables, telecommunications equipment and other devices within network 116 and/or in the communications paths between the systems and entities of FIG. 1.

In accordance with an aspect of the disclosure, the systems and/or systems of the entities shown in FIG. 1 may contain discrete functional program modules that might make use of an application programming interface (API), or other object, software, firmware and/or hardware, to request or provide services of one or more of the other entities or systems within or connected to the network 116. For example, communication can be provided over a communications medium, e.g., client and server systems running on any one of the systems or systems of the entities shown in FIG. 1. These client and server systems may be communicatively coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. Any system in FIG. 1, including the one or more agency management systems 104, the one or more content management systems 102 and the agency management and content management integration system 112, can be considered a client, a server, or both, depending on the circumstances.

Although the physical environment of the network 116 may have connected devices such as computers, the physical environment may alternatively have or be described as comprising various digital devices such as personal digital assistants (PDAs), televisions, MP3 players, etc., software objects such as interfaces, Component Object Model (COM) objects and the like.

There are a variety of systems, components, and network configurations that may also support distributed computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

Figure 2:
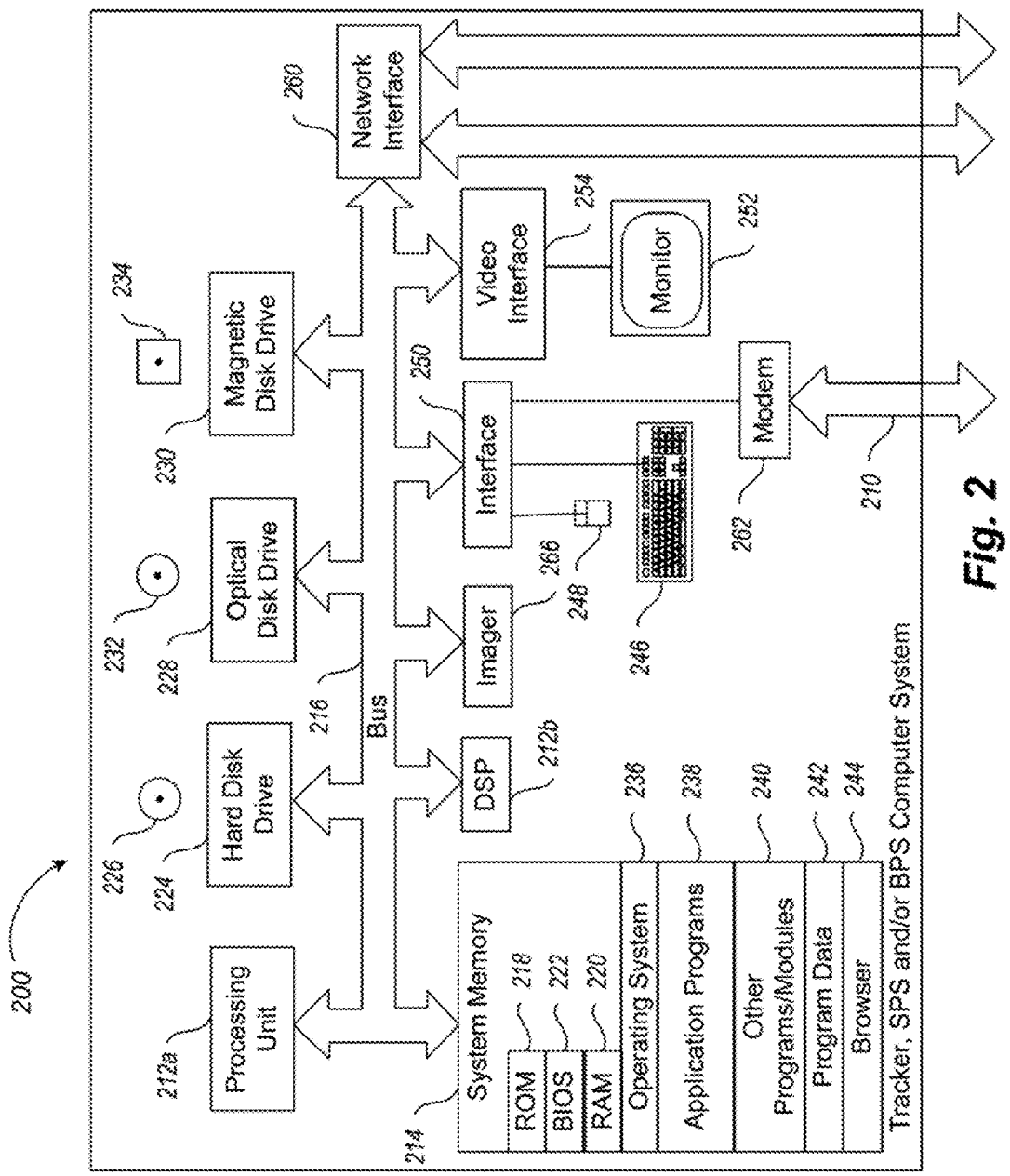
FIG. 2 is a schematic diagram of an example computer system of any one of the entities or systems of FIG. 1, suitable for implementing systems, devices and methods for agency management and content management integration, according to one illustrated embodiment.

FIG. 2 is a schematic diagram of an example computer system of any one of the entities or systems of FIG. 1, suitable for implementing systems, devices and methods for agency management and content management integration, according to one illustrated embodiment.

The computer system 200 is suitable for implementing systems, devices and methods for agency management and content management integration, according to one illustrated embodiment. The computer system 200 will at times be referred to in the singular herein, but this is not intended to limit the embodiments to a single device since in typical embodiments, there may be more than one computer system or devices involved. Unless described otherwise, the construction and operation of the various blocks shown in FIG. 2 are of conventional design. As a result, such blocks need not be described in further detail herein, as they will be understood by those skilled in the relevant art.

The computer system 200 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), programmable gate arrays such as field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the computer system 200. Although the depicted computer system 200 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 212a.

Program modules can be stored in the system memory 214, such as an operating system 236, one or more application programs 238, other programs or modules 240 and program data 242. Application programs 238 may include instructions that cause the processor(s) 212 to provide agency management and content management integration such as, for example, integration between agency management system(s) 104 and content management system(s) 102. Other program modules 240 may include instructions for handling security such as password or other access protection and communications encryption. The system memory 214 may also include communications programs, for example, a Web client or browser 244 for permitting the computer system 200 to access and exchange data with sources such as Web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 116. In a distributed computing environment, program modules may be located in both local and remote memory storage devices.

Previously, attempts have been made to include "light weight" (i.e., lacking full functionality) content management systems into agency management systems to mitigate costs, but these systems cannot compete with a full content management and workflow system. It is more valuable to have the two specialized systems than to have one system and a light weight version of the other. Advantageously, the embodiments described herein integrate the two specialized systems such that the end user, which could be an insurance manager, executive, sales representative, customer service representative, account manager, or even mail indexer gains productivity and data robustness, reducing the cost to the business.

Additionally, some previous attempts have been made to include a completely user driven integration. However, sometimes a user's workflow does not originate in the agency management system, but because the content management system would require the integration to be pushed from the agency management system, the user would have to enter the agency management system, start the integration, and then move back to the content management system. Advantageously, the embodiments described herein immediately reflect changes in the agency management system in the content management system.

Figure 3A:
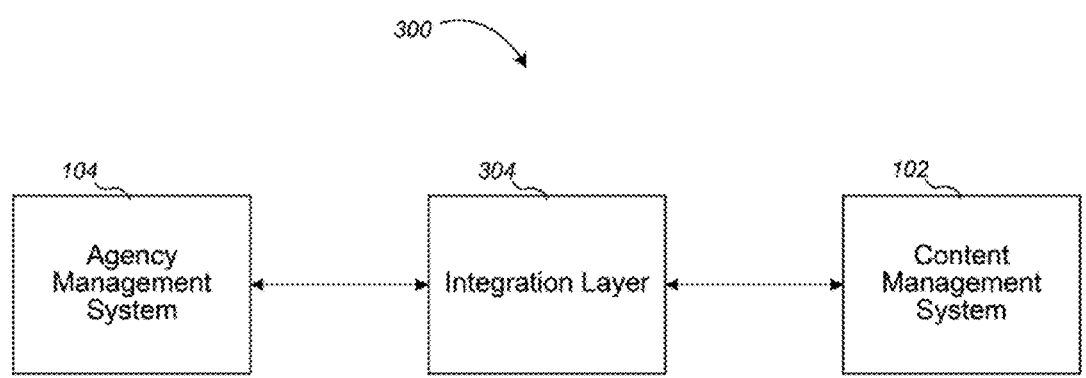
FIG. 3A is a block diagram of the agency management and content management integration, according to one illustrated embodiment.

FIG. 3A is a block diagram of the agency management and content management integration 300, according to one illustrated embodiment. Shown is an agency management system 104, an integration layer 304, and a content management system 102. In one example embodiment, the agency management system 104 is an insurance agency management system that is specialized to handle the domain of insurance business processes and the content management system 102 is a content management system that is specialized to handle content related to insurance and workflow. For example, the agency management system contains insurance data and information (like the insured's name, address, coverage amount, and claim history) while the content management system contains insurance documents (binders, policy documents, media (video, claim photos, recorded conversations with the claimant), correspondence (email, scanned letters), and any manner of notes. Each of these systems is useful to an insurance agency and many insurance agencies choose to have both types of systems. The programs and services that comprise the agency management and content management integration system 112 form an integration layer 304 that communicates between the agency management system 104 and the content management system 102. This integration layer 304 operates in two modes: user interaction mode (front end integration) and automatic mode (back end integration).

Using the integration layer 304, the agency management and content management integration system 112 allows automatic generation of content structure in the content management system for various agency management system domain entities, for example, insurance entities such as clients, submissions, policies, claims, quotes, vendors, employees (staff members), companies (carriers), and transactional elements (activities, tasks, notes, etc.). The agency management and content management integration system 112 provides linking between the agency management system entity to the appropriate content management system structure or structures through a well-defined mapping process (as explained in more detail with reference to FIG. 4 below). Fast navigation is provided between the agency management system 104 and content management system 102 to reduce the amount of manual data entry by the user, thus reducing human error.

The agency management and content management integration system 112 also executes automatic data entry into the content management system 102 to assist content management system workflow processes. Specifically, agency management and content management integration system 112 provides automatic data synchronization into the content management system 102 so that data stays current in the content management system 102 even when the agency management system 104 is changing. Hierarchical content structures are automatically generated by the agency management and content management integration system 112 so that an agency can automatically deploy an organizational structure to their end users. This organizational structure is deployed by organizing content based on domain entity criteria (such as business unit, coverage type, entity type, etc.) and by supporting multiple agencies, including multiple agency management system environments.

Also, multiple content management system structure divisions for the same entities are dynamically provided. For example, one entity may exist in multiple structures in the content management system 102 based on certain domain criteria like business unit or coverage type and a flexible mapping of entities to content structures is used to support the various organizational strategies of different insurance companies.

The agency management and content management integration system 112 includes testing mechanisms and performs logging to aid implementers in troubleshooting connection problems to the agency management system 104 and the content management system 102. A testing platform is also provided for verifying that the mappings are configured per insurance company specifications as well as a hierarchical view of mapping results. This provides an implementer of the content management integration system 112 an easy way to verify the view of the content structures that will be created before actually creating the structures in the content management system 102.

Figure 3B:
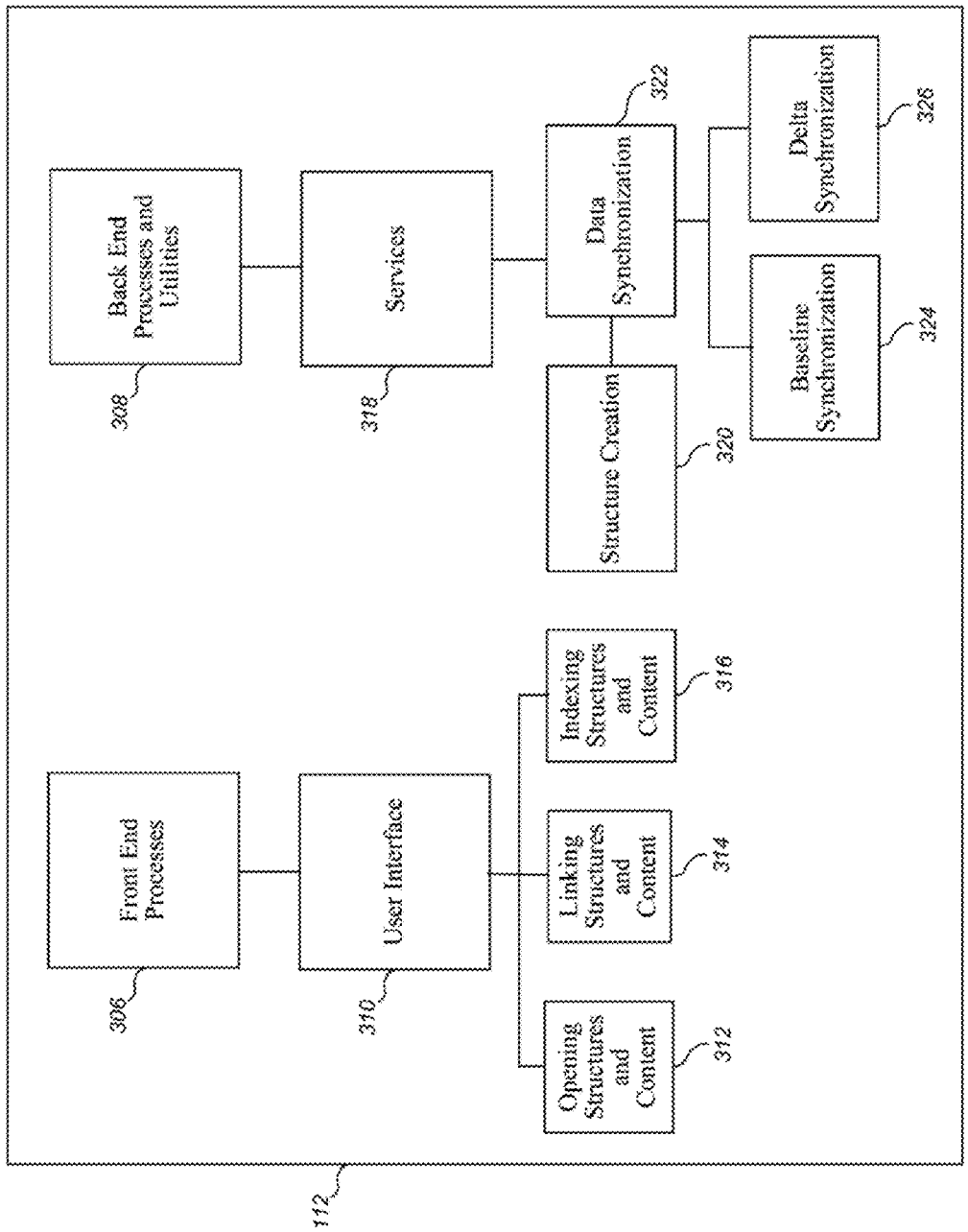
FIG. 3B is a block diagram of the agency management and content management integration system, according to one illustrated embodiment.

FIG. 3B is a block diagram of the agency management and content management integration system 112, according to one illustrated embodiment. The agency management and content management integration system includes two major divisions, front end processes 306 and back end processes 308.

Front end processes 306 include software elements that the end user directly interacts with to perform work. Primarily, this includes providing a user interface 310 or user interface elements within the agency management system 104. The user interface 310 has icons, buttons or other selectable user interface elements that a user clicks on, presses or otherwise selects within the agency management system 104 while viewing a particular domain entity. These selections perform actions such as opening 312, linking 314, and indexing 316 data structures and content in the content management system 102.

Back end processes and utilities 308 include software elements that may be automated and may run as services. The structure creation element 320 creates structures in the content management system 102 and the data synchronization element 322 synchronizes data in the content management system 102 to match entities in the agency management system 104. The various synchronization processes of the data synchronization element 322 take the entities in the agency management system 104 as input and generates corresponding structures in the content management system 102 using the structure creation element 320 based on mappings defined by the user.

There are two synchronization processes, the baseline synchronization process 324 and the delta synchronization process 326. The baseline synchronization process 324 is responsible for initial structure creation and en masse structure updates in the content management system 102. In one embodiment the baseline synchronization process 324 is manually started and runs and finishes completely. The delta synchronization process 326 performs continuous content structure creation and updating. In one embodiment, the delta synchronization process 326 runs at all times as a service and uses one of two strategies to receive changes in the agency management system. For example, the delta synchronization process either polls the agency management system for changes or receives notifications from the agency management system that a change has occurred and then updates the content management system accordingly. There are various configuration points and configuration utilities that allow an implementer of the agency management and content management integration system 112 to configure and manage configurations and the operation of the various utilities. Also, some of these utilities configure the front end processes 306.

Figure 4:
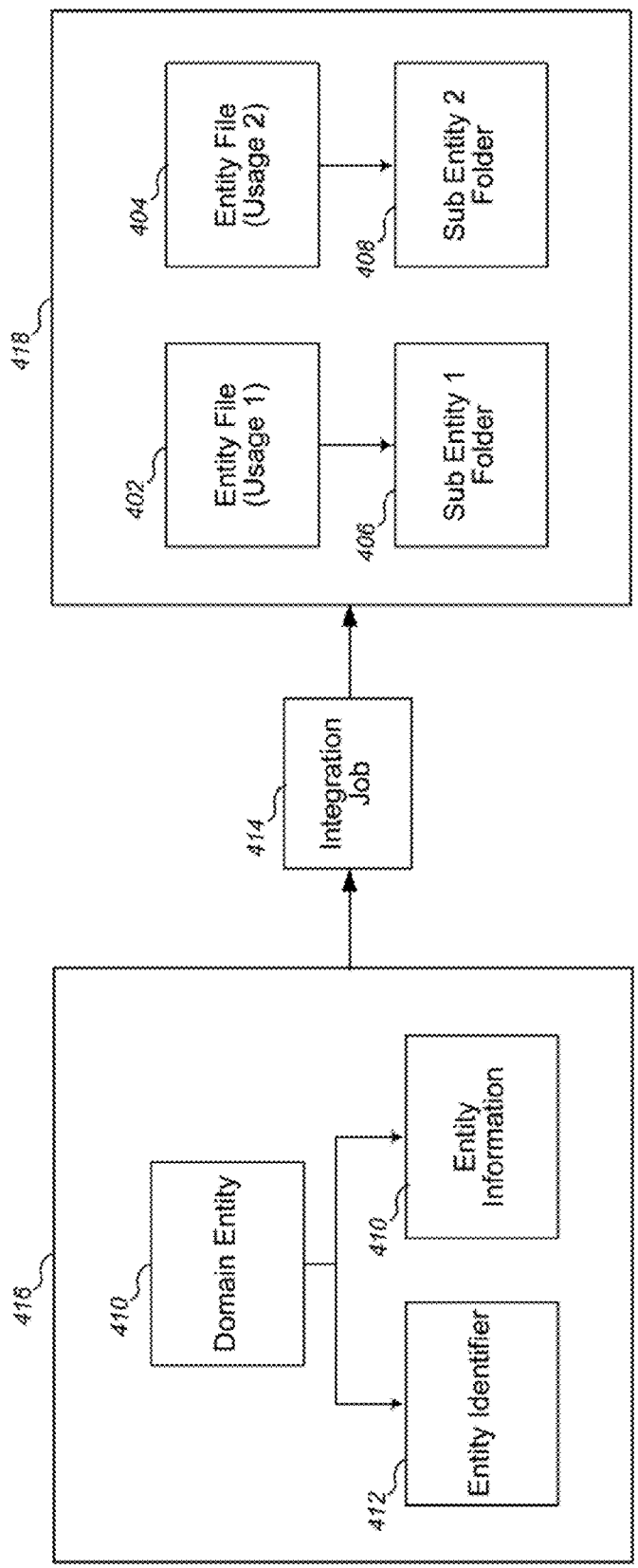
FIG. 4 is an illustration of domain entity structures and content management system structures such as files and folders, according to one illustrated embodiment.

FIG. 4 is an illustration of domain entity structures 416 and content management system structures such as file container 418. File container 418 includes example files 402 404 and corresponding folders 406 408, according to one illustrated embodiment. The agency management and content management integration system 112 integrates domain entities, such as example domain entity 410 in the account management system of the agency management system 104, into the content management system structures such as files 402 404 and folders 406 408 via an integration job 414. Every entity is uniquely identified by an entity identifier 412 that can be represented by a string that is unique to that agency and to that type of entity (e.g., Agency 1 and Agency 2 could both have clients with ids of 1, but Agency 1 would not have two clients with ids of 1, also Agency 1 could have a client with an identifier of 1 and a policy with an identifier of 1). An entity 410 may also have various entity information 410 associated with that particular entity. In an insurance agency example, clients have a client identifier, insurance policies have a policy identifier, and insurance claims have a claim identifier.

In the content management system, the entity 410 is represented by either a file 402 or 404 or a folder 406 408. Entities that are represented by a file 402 or 404 are called top level entities (such as clients and vendors of an insurance agency). Some entities are hierarchically related to other entities. In an insurance agency example, clients own policies and policies have claims submitted against them. In the content management system, the sub-entities are represented by folders 406 or 408 in the file 402 or 404 (e.g., policy or claim folders in client files) or folders in another folder (e.g., claim folders in policy folders). Also, parent folders can be configured for these sub folders based on other criteria (e.g., a claims folder to hold all claim folders or a policy term folder that holds all policies of a specific year).

Top level entities (e.g., domain entity 410) may or may not have multiple content structures (e.g., files 402 or 404 and folders 406 and 408) that match them. This duplication results from the way entities are mapped into the content management system 102. Insurance industry business rules often divide up the work that is done on a client based on specific usage criteria of the work being done. For example, a client that belongs to a certain division of a company may in some cases only be worked on by that division. A client with a policy of a certain type may in some cases only be worked on by a specific group in that company. Because of the content management system's ability to provide security features based on content structure to match the agency's work structure, it is often advantageous place a client in different file containers. All files 402 404 within a file container 418 are unique, but uniqueness is not required between file containers. For example, in the ImageRight® content management system, these file containers are specified by three content structure concepts: location, drawer, and file type. A file is considered unique based on its file number within a container 418. Work for one client may be split across the organization, which may be referred to herein as a work division, in which case it is beneficial to the organization to have a separate file container 418 for each work division.

Also, some content management system content structures may require additional originations of content within that entity's structure. For example, a policy may have endorsement content or application content. By allowing the precreation of these sub structures, the agency management and content management integration system 112 allows the organization to enforce a consistent organizational scheme throughout the system, removing the burden from the end user.

Figure 5:
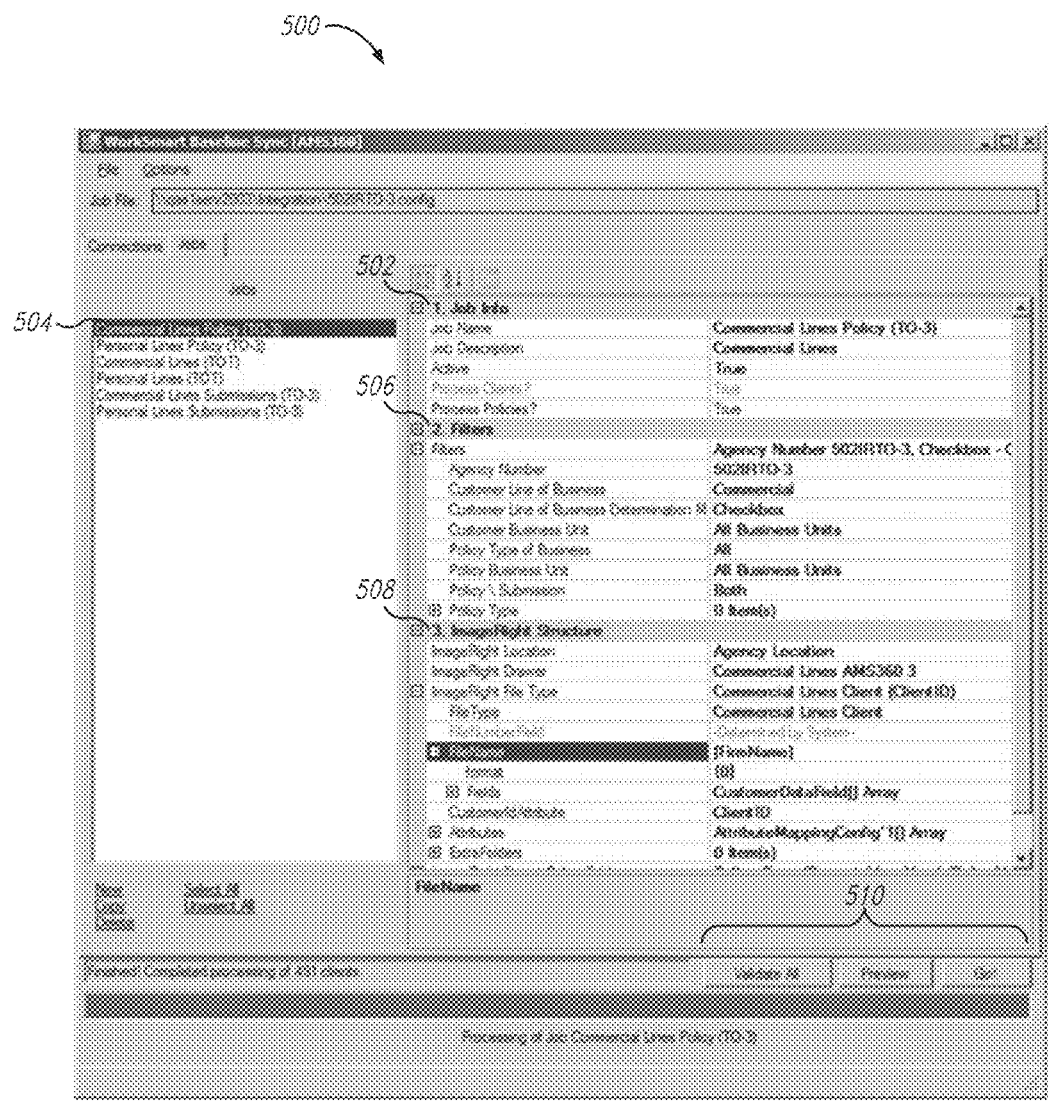
FIG. 5 is a screen shot of a user interface for configuration of an agency's work divisions in integration jobs, according to one illustrated embodiment.
Figure 6:
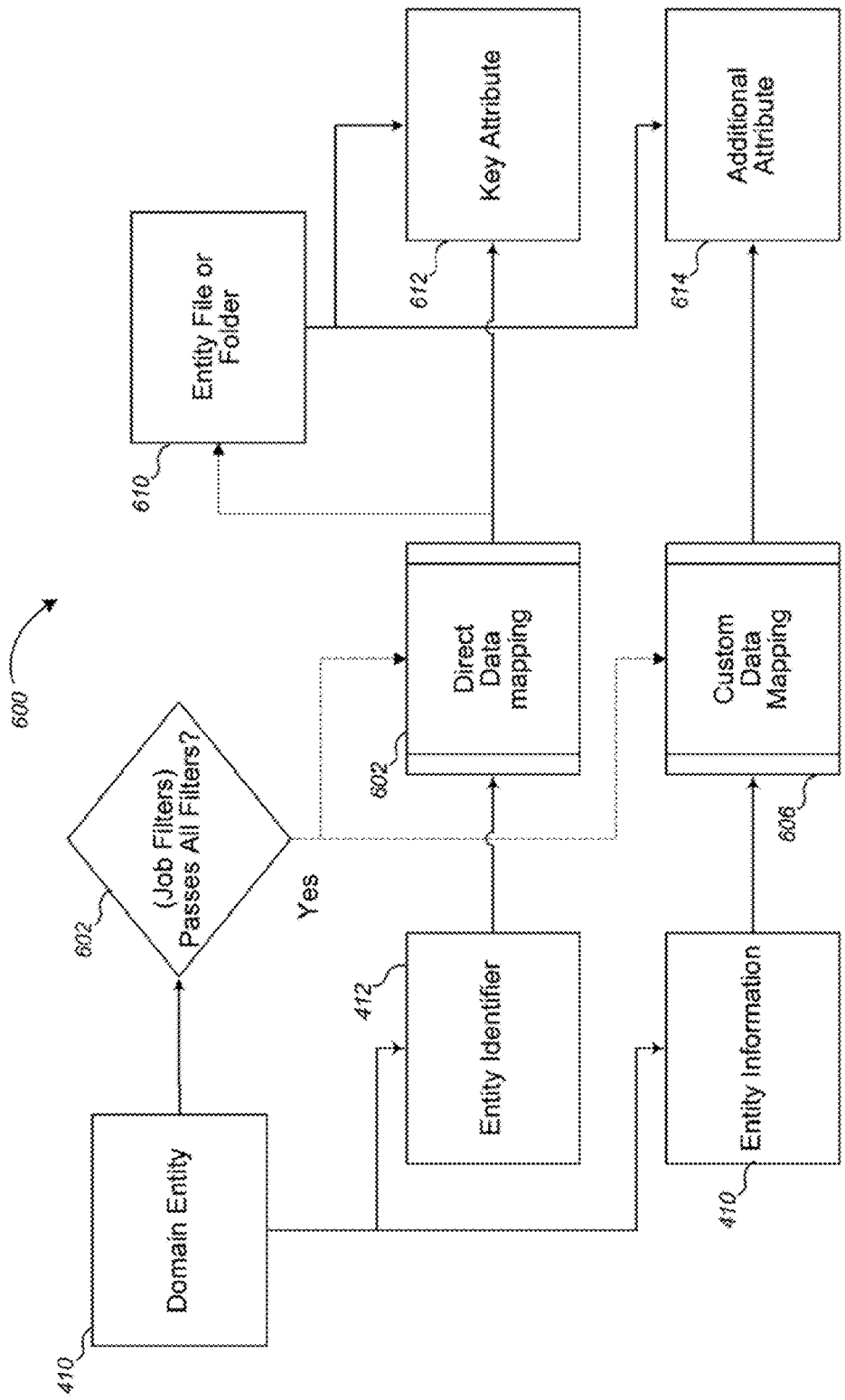
FIG. 6 is block diagram illustrating configuration of an agency's work divisions in integration jobs, according to one illustrated embodiment.

FIG. 5 is an example screen shot of a user interface 500 for configuration of an agency's work divisions in integration jobs and FIG. 6 is a corresponding block diagram illustrating the configuration 600 of an agency's work divisions in integration jobs. The agency management and content management integration system 112 allows the configuration of an agency's work divisions in integration jobs. An integration job 414 (shown in FIG. 4) is a set of entity filters and content management structure mappings for any entities that pass all of those filters. For each unique domain entity, each integration job uniquely identifies a file in a content structure file container 418 (also shown in FIG. 4). This is accomplished by a series of filters that are exercised against each entity for each integration job 414.

Shown on the user interface 500 is example integration job information 502 for the commercial lines policy work division 504, associated entity filters 506 for the integration job 414, and an associated content structure 508 for the integration job 414. Also shown are user interface controls 510 for executing the applicable integration job 414.

Referring now to FIG. 6, a filter 602 examines information on the domain entity 410 (for example, for clients, it may look at the line of business for the client), and accepts or rejects the entity based on that criteria. If an entity passes the all criteria setup by the filters (indicated by the dashed "Yes" arrow), then direct data mappings are applied to the entity using the entity identifier 412 to determine the final content management structure.

If an entity passes the all criteria setup by the filters (indicated by the dashed "Yes" arrow), then custom data mapping component 606 may be applied to the entity 410 using other entity information 410 to further determine the final content management structure. For files, the unique entity identifier 412 is directly mapped to an associated file number 610. For all entity files and entity folders, the unique entity identifier 412 is directly mapped to one specified key attribute 612 on the file or folder. Also, additional entity information 410 may be mapped to an additional attribute 614 resulting from the output of the custom data mapping component 606. In one embodiment, the filters 602 are configured to ensure that there is only one integration job per work division so that files are not duplicated within a work division.

Some entities are hierarchically related to other entities. For example, clients own policies and policies have claims submitted against them. In the content management system, these sub-entities are represented by folders in the file. Files can contain folders and folders can contain further folders. In one embodiment, the system only has one folder representing a sub-entity across the entire content management system. This is enforced through proper creation of integration jobs.

In one embodiment, the back end processes automatically perform these jobs whenever a change is detected in the agency management system 104 and the front end processes 306 allow a user to access the entity file or folder from the agency management system object after the integration job 414 has been executed.

In one embodiment, there are integrations between AMS360®, Sagitta®, and the BenefitPoint (BP)® agency management systems and the content management system supported is ImageRight® (IR).

Figure 7:
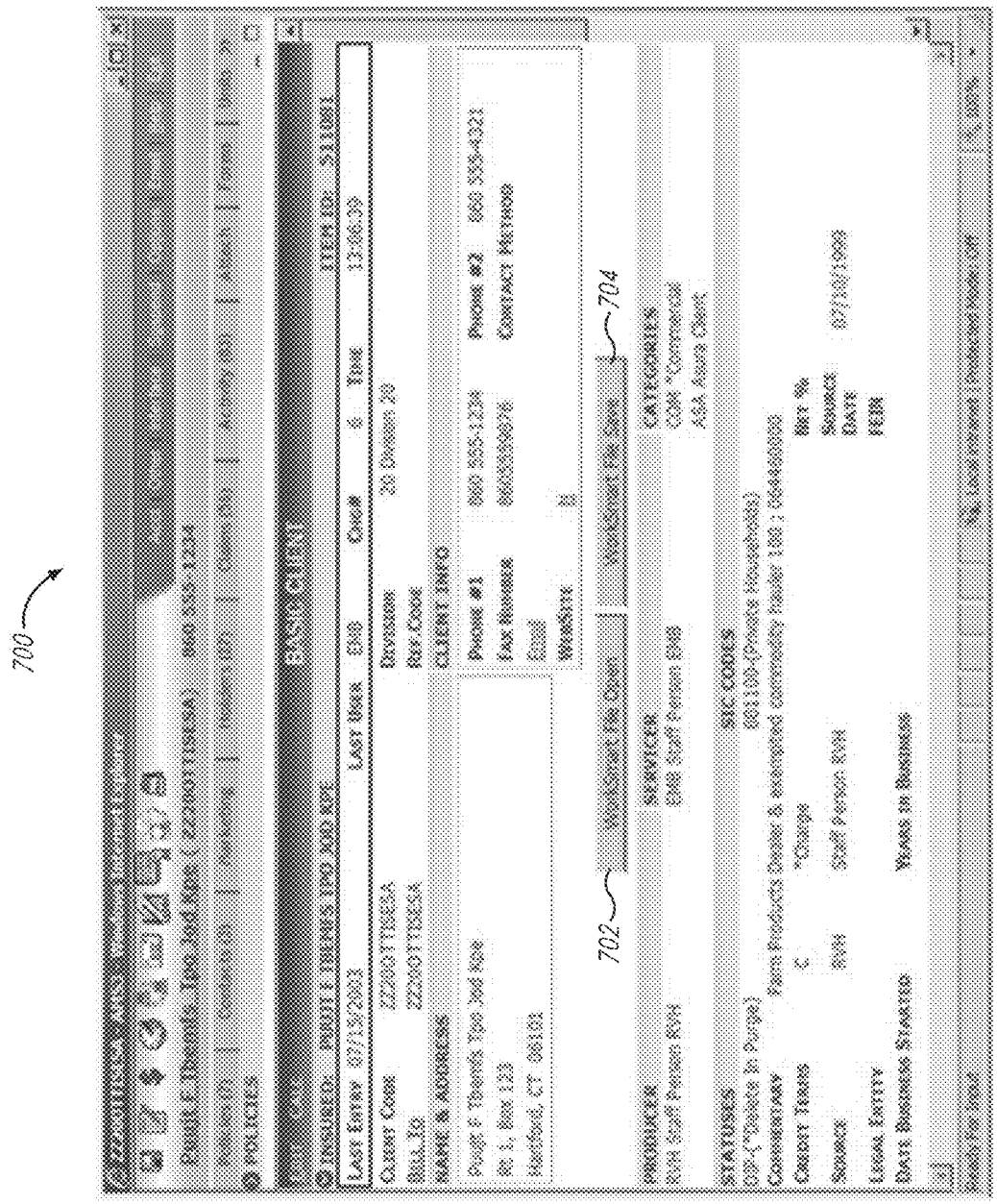
FIG. 7 is a screen shot of a user interface for performing content management system actions from an agency management system, according to one illustrated embodiment.

The agency management and content management integration system enables a user to perform content management system actions from the agency management system 104. Shown in FIG. 7, is a screen shot 700 of an example user interface for performing content management system actions from an agency management system 104. In particular, shown is a screenshot of a user interface of the AMS360® agency management system, as modified and customized according to the embodiments described herein. For example, Integration points have been built into this program in the form of buttons labeled "WorkSmart File Open" 702 and "WorkSmart File Save" 704. Pressing the buttons 702 704 within the agency management system interface 700 initiates integration of the agency management and content management as described below.

Figure 8:
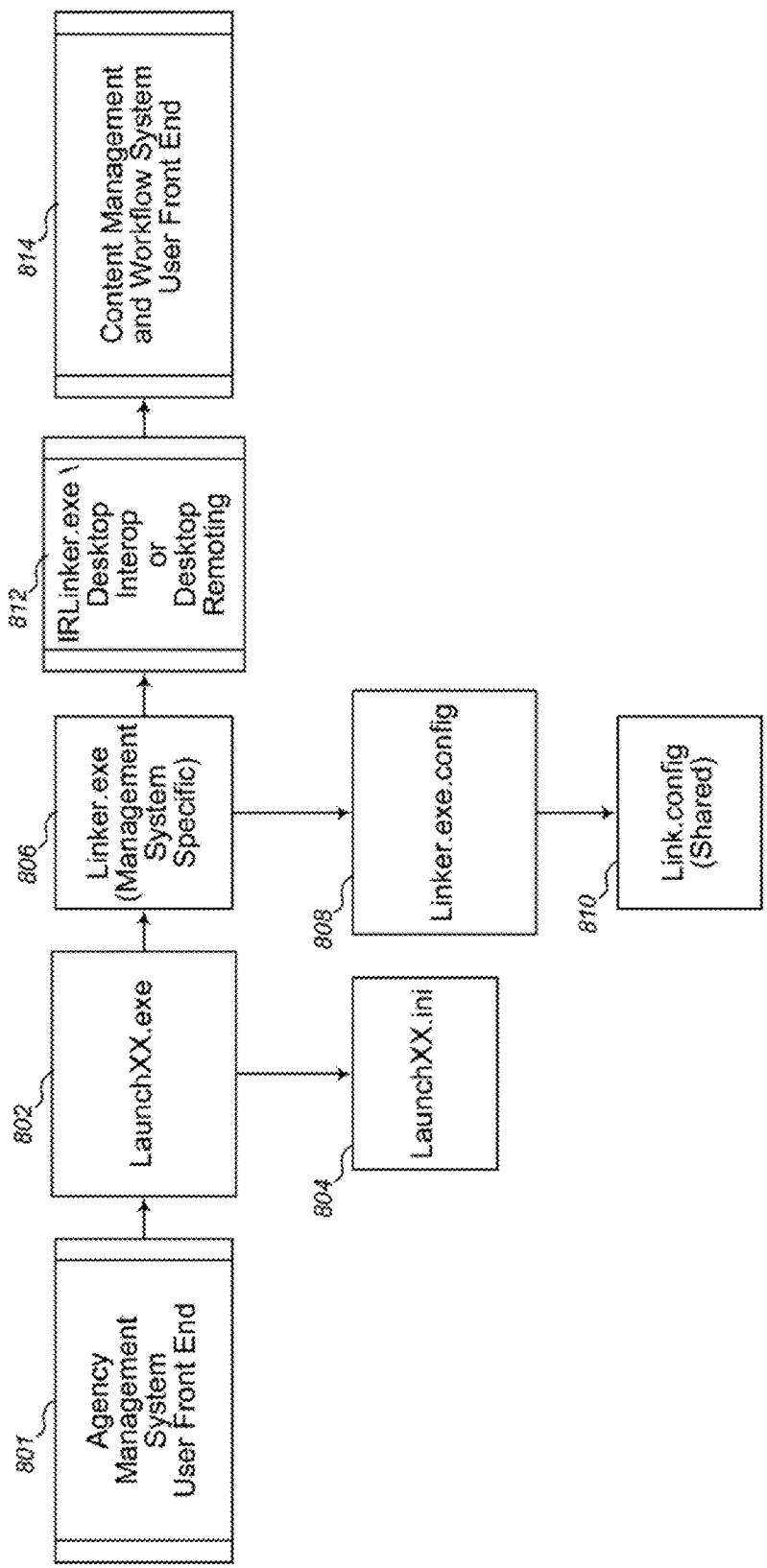
FIG. 8 is block diagram illustrating front end integration of agency management and content management, according to one illustrated embodiment.

FIG. 8 is block diagram illustrating integration of agency management and content management. In particular, FIG. 8 shows the relationship of components involved in the process of front end integration as performed by the agency management and content management integration system 112 (also referred to as WorkSmart herein). In one embodiment, the entry points for front end integration are a series of launch programs collectively denoted as a LaunchXX.exe program 802. For example, the launch programs may be LaunchMD.exe for the WorkSmart File Open button 702, LaunchPG.exe for WorkSmart File Save button 704, and LaunchAC.exe for accounting integrations represented by another WorkSmart button (not shown). These programs may be installed on the user's environment.

Selecting the applicable button within the agency management system user front end 801 calls the LaunchXX.exe program 802 with a specific command line. The command line contains information that identifies and describes the current domain entity 410, in this case an AMS360® client. A client (called a customer in the AMS360® system and an account in BenefitPoint® system) is identified by some unique string in each system called the client. For AMS360®, the client identifier is a globally unique identifier (GUID). Also, the different LaunchXX.exe programs 802 each represent an action (Open, Save, Accounting Management). The command line is reformatted by the LaunchXX.exe program 802 based on the contents of the LaunchXX.ini file 804 and based on the intended action. This reformatting results in a command line for one of the various linker programs denoted collectively as Linker.exe 806 (e.g., AMS360Link.exe for the AMS360® system, SagittaLink.exe for the Sagitta® system and BPLink.exe for the BenefitPoint® system). After this reformatting, the command line is then executed.

The Linker.exe programs 806 (e.g., AMS360Linker.exe, SagittaLinker.exe, and BPLinker.exe) have agency management system specific knowledge and are configured to match the integration jobs defined for the integrated environment. The configurations are placed in a configuration file, denoted as Link.config file 810, that is shared between all users in the environment by placing it on a network share. On the users' system, only the linker.exe.config file 808 needs to be altered to point to this shared Link.config file 810. This allows all users' configurations to be updated by changing just one file. The Linker.exe program 806 maps the entity identification 412 and information 410 to the content management system 102 and calls the content management systems exposed interoperability interface, denoted as IRLinker.exe 812, to perform the desired command on the resulting content structure or structures that will be reflected on the content management and workflow system user front end 814.

The specific actions enabled by the agency management and content management integration system 112 are Open, Save, and Account Management. Performing an Open action on a top level entity will cause the content management system 102 to navigate to structures matching the entity 410 based on the key attributes 612 placed on the structure by the back end integration process 308. It will also attempt to create the appropriate file in the content management system 102 if it does not exist, filling in the key attributes 612 at that time. Performing an Open action on a sub entity will cause the content management system 102 to navigate to the structures matching the entity 410. If no matching structures are found, nothing will be created.

Figure 9:
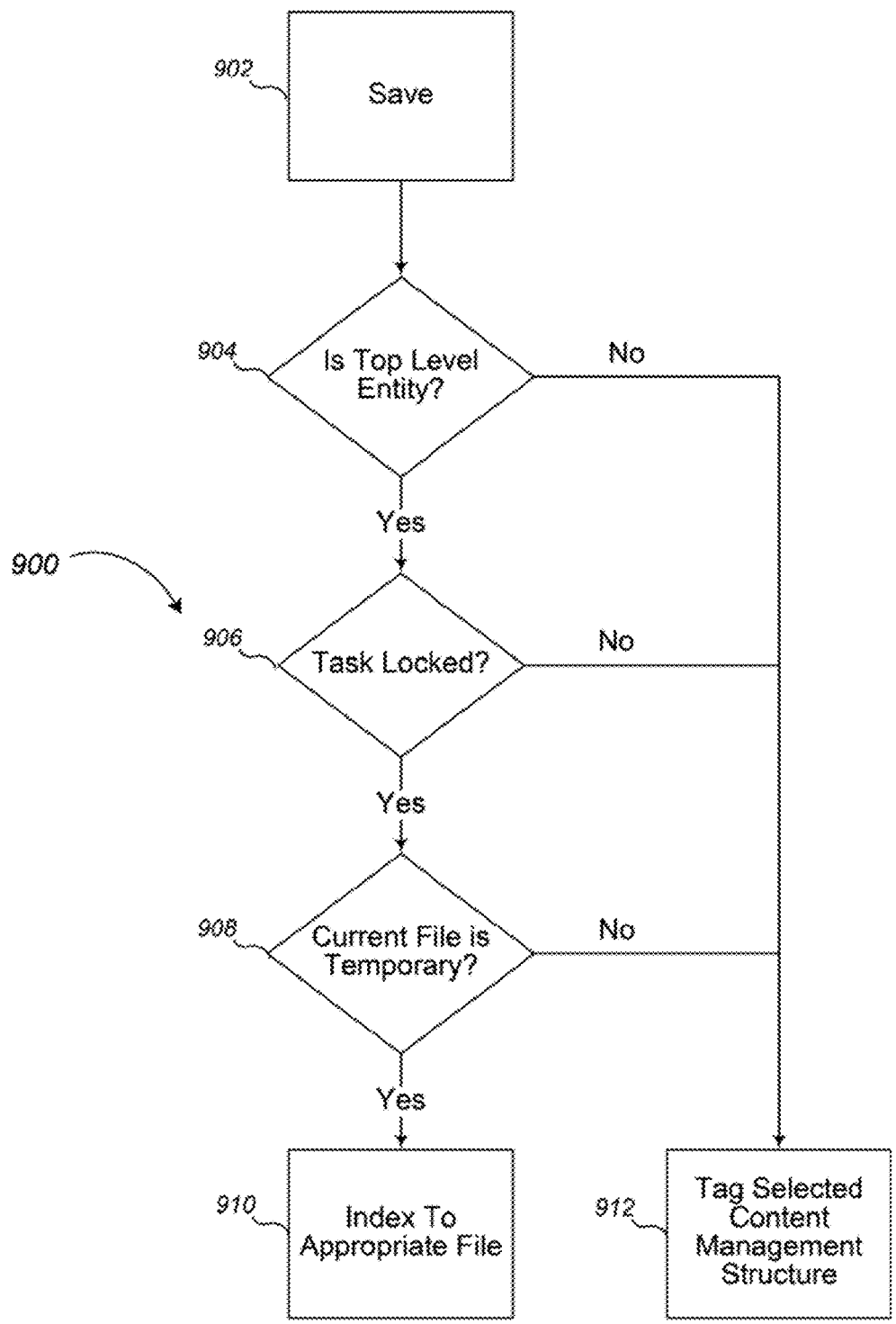
FIG. 9 is flow diagram illustrating a process of a save action performed in a system for agency management and content management integration, according to one illustrated embodiment.

Performing the Save action on an entity 410 will have a content management system context-specific result. FIG. 9 is flow diagram illustrating a process 900 of a save action performed in the agency management and content management integration system 112.

The process 900 starts at the Save action 902, such as when the user clicks the WorkSmart File Save button 704 shown in FIG. 700 initiating the Save action 902. The process will result in either tagging content structures at 912 or indexing the selected content structures at 910 to an existing file.

At 904 a processor determines whether the entity to which the Save action pertains 902 is a top level entity.

At 906, if it was determined that the entity to which the Save action pertains 902 is a top level entity, then the processor determines whether the workflow task is locked for that entity.

At 908, if it was determined that the workflow task is locked for that entity, then the processor determines whether the current file to be saved is marked as temporary.

At 910, if it was determined that the current file to be saved is marked as temporary, then the processor indexes the selected content structures to an appropriate existing file.

At 912 if it was determined that the entity to which the Save action pertains is not a top level entity, or that the workflow task not locked for that entity or that the current file to be saved is not marked as temporary, then the processor tags the selected content structures. The tagging action marks the content management structure with the key attributes 612 of the domain entity 410. This tagging works on both top level entities and sub entities. This allows the Open action to use the key attributes to find the content management structure. On the other hand, the indexing action only works on top level entities and moves the selected content into the correct top level content structure matching the entity based on key attributes. The original top level structure is marked as temporary, and a workflow task should be locked on some structure in the original top level structure or the Save action will perform the tag option instead of the indexing action as illustrated process 900.

Figure 10A:
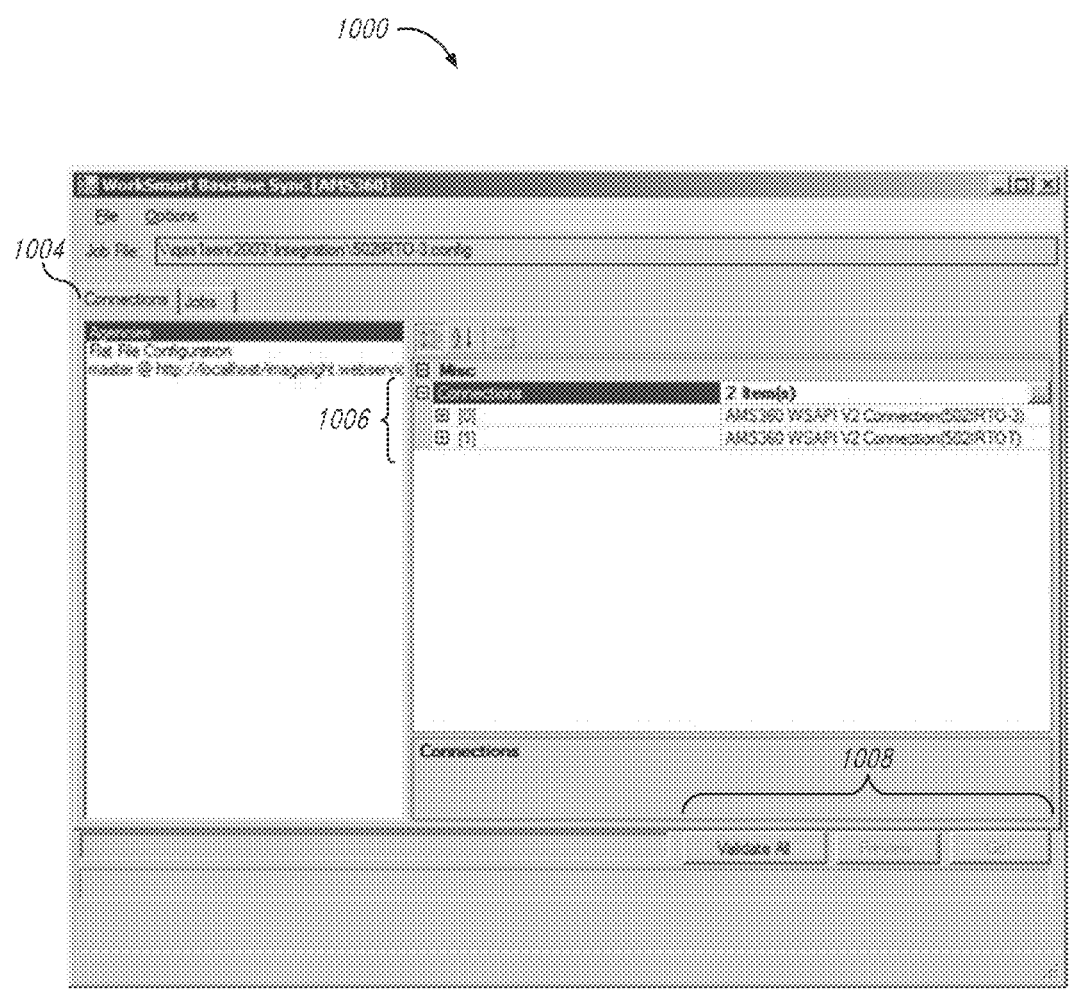
FIG. 10A is a screen shot of a user interface of the initial creation piece of the system for agency management and content management integration for creation of the content management system structures based on an agency management system's entities, according to one illustrated embodiment.
Figure 10B:
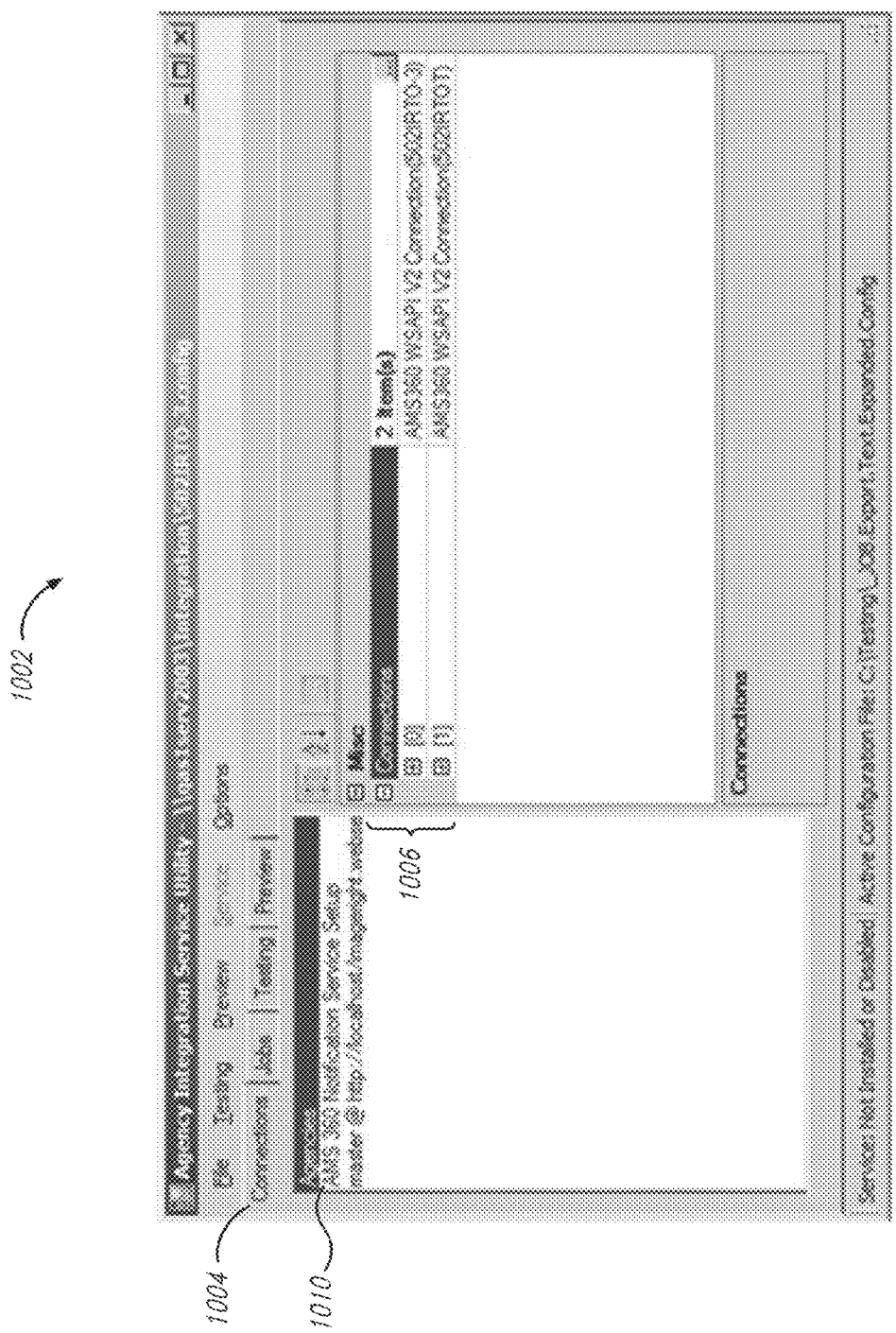
FIG. 10B is another screen shot of a user interface of the initial creation piece of the system for agency management and content management integration for creation of the content management system structures based on an agency management system's entities, according to one illustrated embodiment.

The Agency management and content management integration system 112 pre-creates content management system structures based on the agency management systems' entities in an automated fashion. FIGS. 10A and 10B are screen shots of example user interfaces 1000 1002 of the initial creation piece of the system for agency management and content management integration for creation of the content management system structures based on an agency management system's entities, according to one illustrated embodiment.

The agency management and content management integration system 112 provides a set of utilities to help pre-create data structures so that users do not have to manually enter data into the content management system 102. Shown on user interfaces 1000 and 1002 is a connections tab 1004 under which agency management system connections 1006 are displayed. Based on these agency management system connections 1006, content management system structures will be created in response to a user interacting with the user selectable controls 1008 shown on user interface 1000 or by subscribing to a synchronization service 1010 shown in interface 1002.

Often, an agency has insurance data before implementing the agency management and content management integration system 112. The agency management and content management integration system 112 provides a way to create the vast amount of structure for all of an agency's data. The baseline synchronization process 324 executed by one or more processors performs this function. The baseline synchronization process 324 provides on a large scale the ability to take information from an existing agency management system and apply it to the content management system 102.

Also, once the user has run the baseline synchronization process 324, the user will start to change their agency management system data. In order to keep the content management system 102 synchronized with the agency management system 104, changes in the agency management system 104 are constantly or nearly constantly reflected in content management system 102. The delta synchronization process 326 performs this function.

Figure 10C:
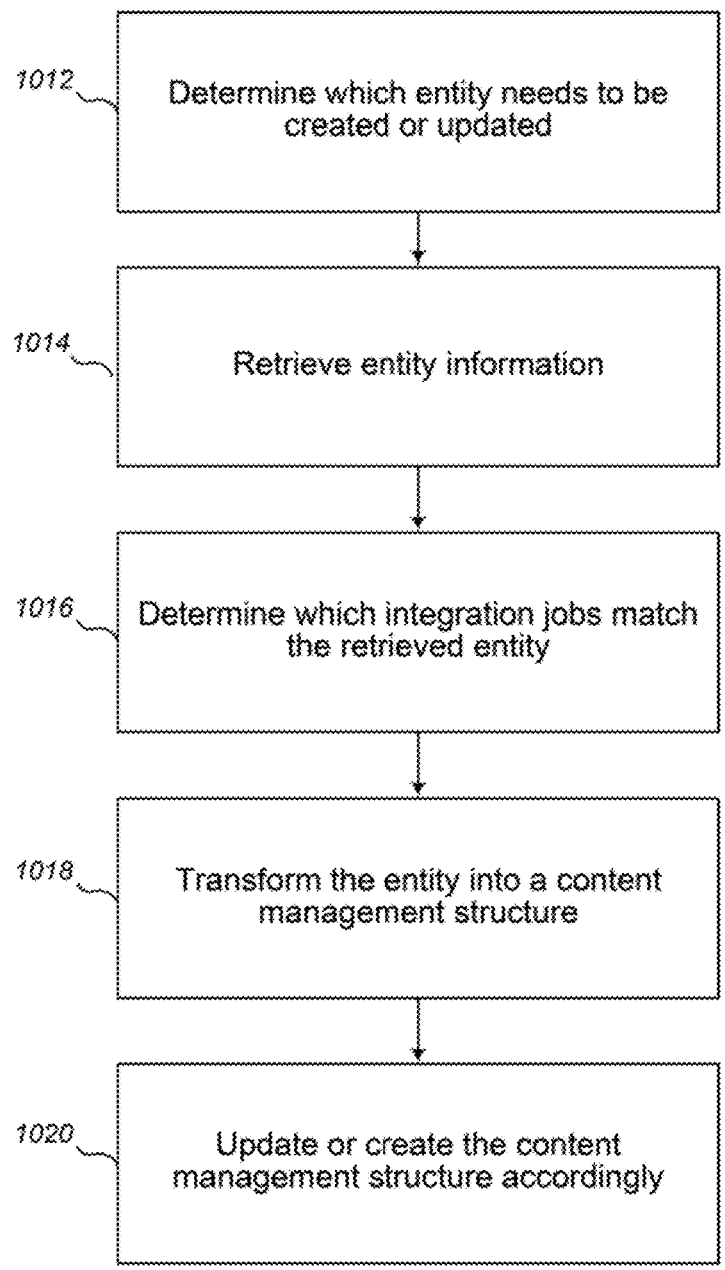
FIG. 10C is a flow diagram illustrating a process of synchronization of data between a content management system and an agency management system, according to one illustrated embodiment.

FIG. 10C is a flow diagram illustrating a general process of synchronization of data between a content management system and an agency management system, applicable to the baseline synchronization and delta synchronization.

At 1012, the agency management and content management integration system 112 determines which entity needs to be created or updated.

At 1014, the agency management and content management integration system 112 retrieves the entity information (e.g., from the agency management system 104).

At 1016, the agency management and content management integration system 112 determines which integration jobs match the retrieved entity (e.g., integration job 414).

At 1018, the agency management and content management integration system 112 transforms or maps the entity into a content management structure (e.g., a content management system structure such as file container 418 and the related substructures).

At 1020, the agency management and content management integration system 112 creates or updates the content management structure accordingly to synchronize data between the content management system 102 and agency management system 104.

Figure 11:
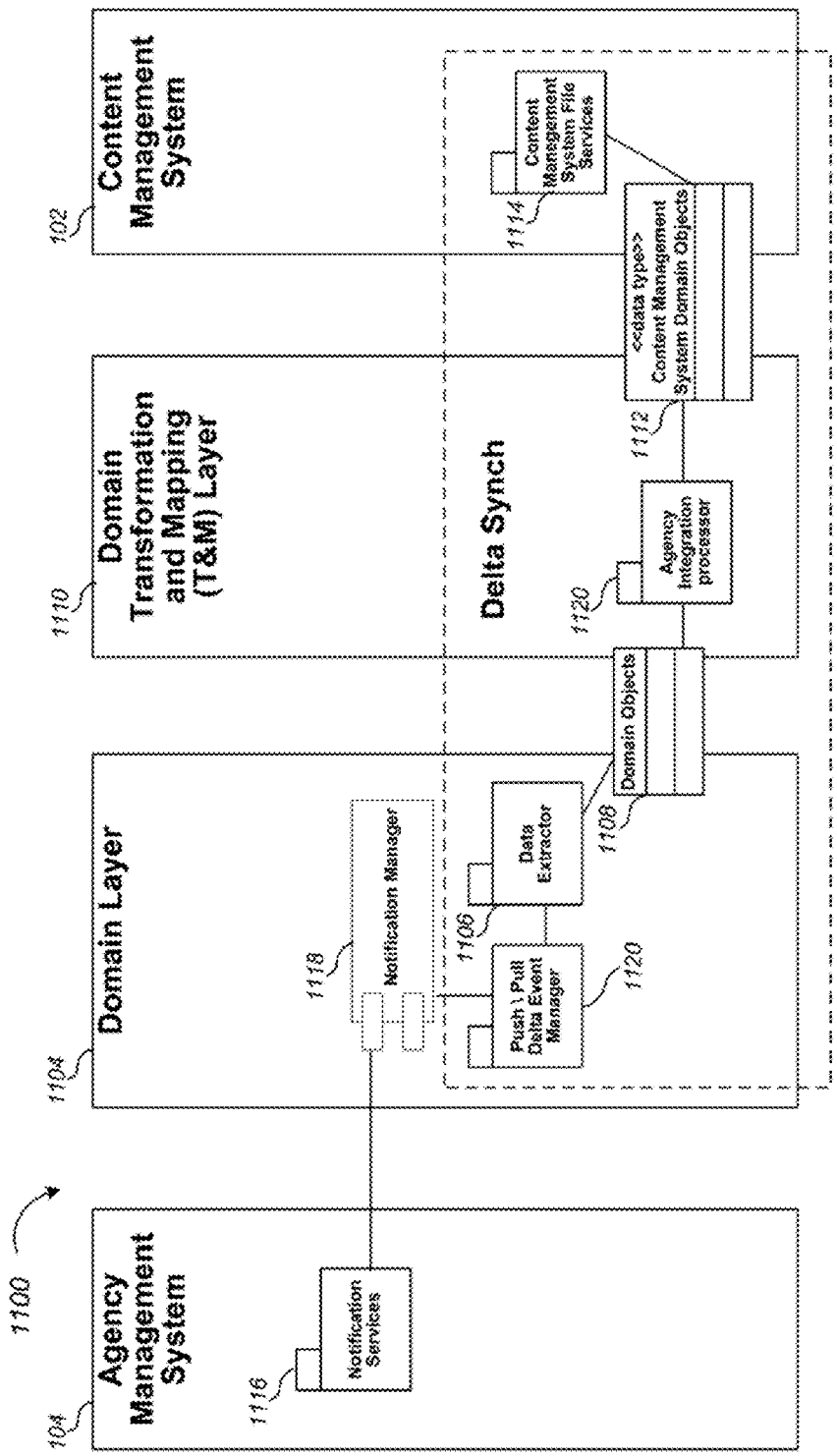
FIG. 11 is a diagram illustrating an update (delta) synchronization system architecture comprising a backend integration piece of the agency management and content management integration system, according to one illustrated embodiment.
Figure 12:
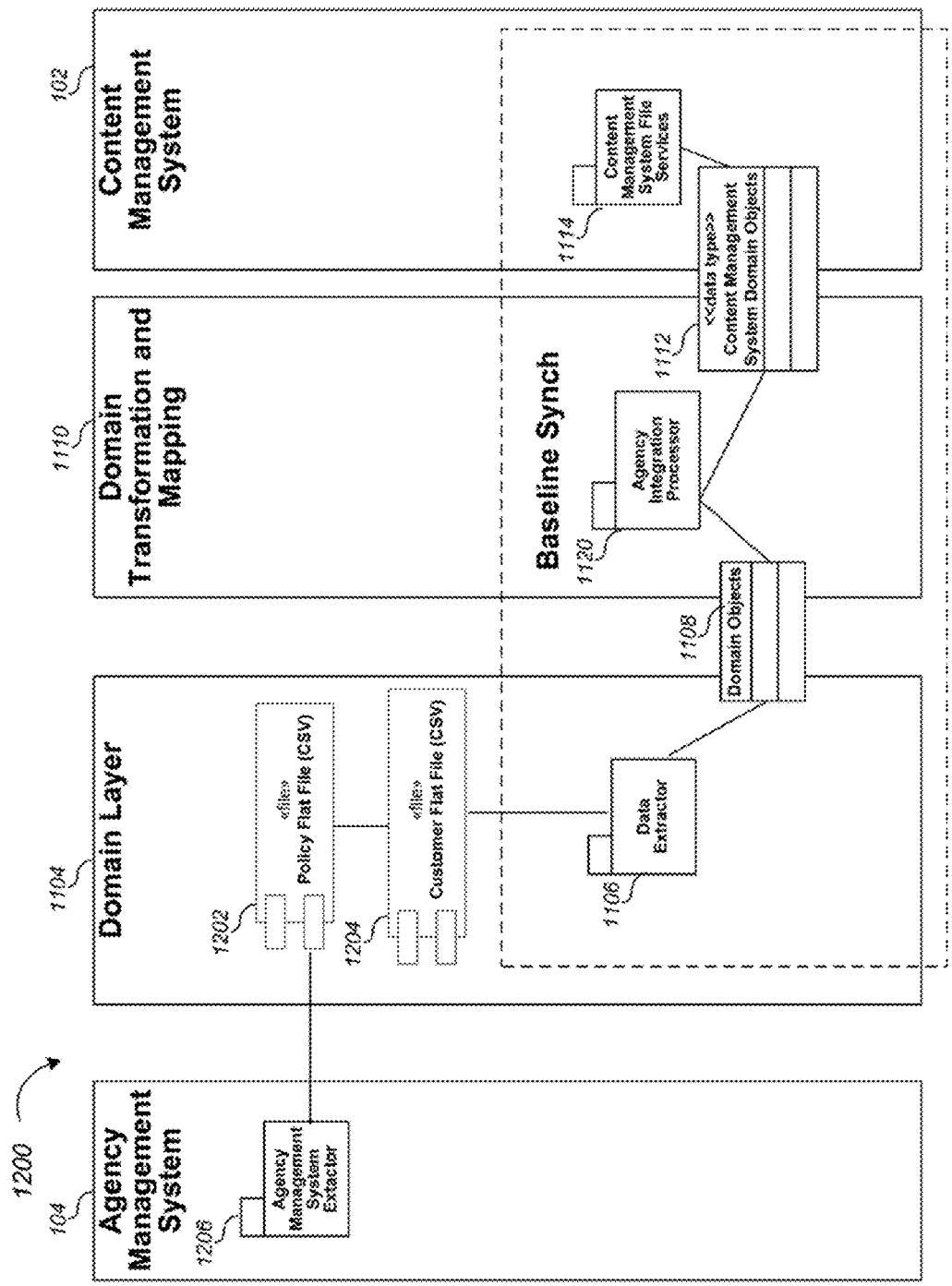
FIG. 12 is a diagram illustrating a baseline synchronization system architecture comprising a backend integration piece of the agency management and content management integration system, according to one illustrated embodiment.

FIG. 11 and FIG. 12 are diagrams illustrating an update (delta) synchronization system architecture 1100 and a baseline synchronization system architecture 1200 comprising a backend integration module of the agency management and content management integration system 112, according to one illustrated embodiment.

First will be described components common to both the update (delta) synchronization system architecture 1100 and a baseline synchronization system architecture 1200 of the backend integration module. There are three layers to the backend integration module. The first layer is the domain layer 1104, where the backend integration module retrieves source data from some source such as the agency management system 104. However, the source may vary depending on the integration piece. After forming a connection to this source, a data extractor 1106 creates a generic data representation for the entity and is referred to as domain objects 1108.

These domain objects 1108 are passed to the domain transformation and mapping layer 1110. The domain transformation and mapping layer 1110 converts domain objects into content management system domain objects 1112, which are structures like locations, drawers, files, and folders based on integration jobs. Finally, these content management system domain objects 1112 are passed to the file services layer 1114 of the content management system 102. This file services layer 1114 takes the representations of the content management system domain objects 1112 and actually applies changes therein to the content management system 102. This layered system allows for changes in either the agency management system 104 or content management system 102 to not affect large portions of the system.

The data extractor 1106 contains the entities that might need to be created or updated. If a sub entity is included, its parent entity is included also, so that the integration jobs can correctly process it. The data extractor 1106 can be made to connect to any agency system and in various ways.

For the baseline synchronization architecture 1200, the agency management and content management integration system 112 uses extracted files from the Agency Management System Extractor 1206 containing the information for all or a subset of entities in the agency management system 104. From these files, the latency of web service calls and database queries is avoided. Because of the large amount of data that may need to be initialized or updated, these latencies can render the baseline synchronization process unusable as millions of entities each add a few seconds of latency. For example, in the AMS360® management system, the baseline synchronization process uses comma separated value (CSV)

files 1202 1204 containing entity data per line. For the Sagitta® agency management system, the baseline synchronization process uses XML files containing a hierarchy of data. However any file format may be used for integration of other types of systems that is capable of presenting data in an organized fashion.

For the delta synchronization architecture 1100, the connection is a web service exposed by the agency management system denoted by the notification services block 1116 in the agency management system 104. In order to know when a change has happened, the agency management and content management integration system 112 either polls the agency management system 104 on a periodic or nonperiodic (i.e., aperiodic) basis or is notified by the agency management system 104 through the notification services 1116 whenever a change occurs. This is controlled by the notification manager 1118 and the push/pull delta event manager 1120 in the domain layer 1104. For example, in the AMS360® agency management system, a delta event manager exposes a notification port that is a web service from the notification services 1116 that the agency management system 104 can call to report changes. For the Sagitta® agency management system, the Web service is polled at intervals to determine the changes. From this information, the entities are determined and domain objects 1108 are created for the entities. The agency management and content management integration system 112 may include one or both of the capabilities to poll the agency management system 104 or be notified by the agency management system 104 through the notification services 1116 to determine the changes. The domain objects 1108 contain an identifier and all additional data that the user may want mapped to the content management system 102.

The agency integration processor 1120 of the domain transformation and mapping layer 1110 takes the domain objects 1108 and turns them into content management system domain objects 1112 based on the user defined integration jobs. There is often data relationally related to the data received in the domain object 1108 that needs to be mapped to the content management system 102. For example, a customer service representative has a first and last name. The entity may represent the customer service representative as a code (for example, "CSR52" or "!!◯"). In the content management system 102, one may want to see "John Smith". To do this, the agency management and content management integration system 112 connects to the agency management system 104, gathers the related data, and when an entity is encountered that has a mapping to this secondary data, the agency management and content management integration system 112 looks up the value as configured by the job and substitutes it.

Figure 13:
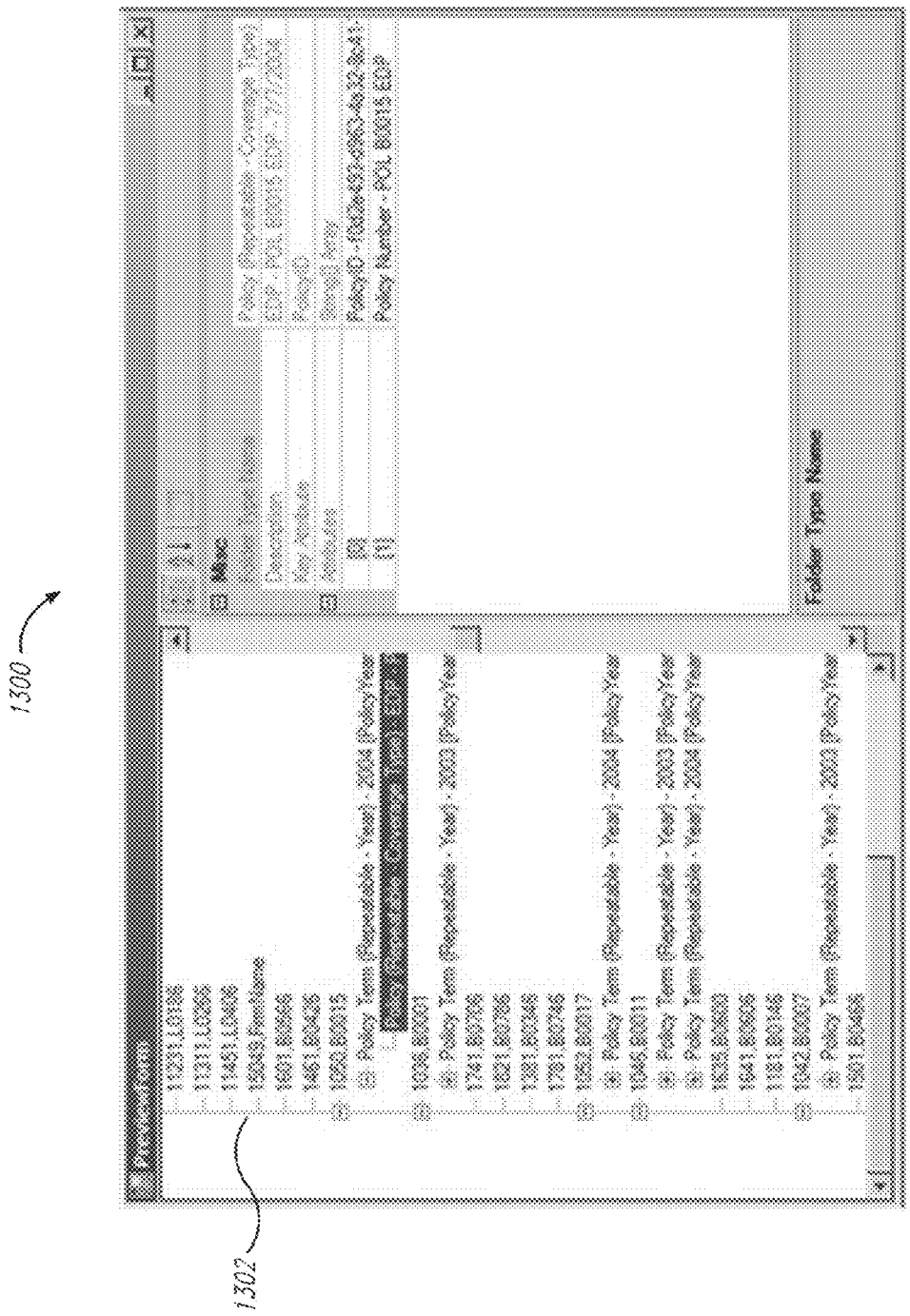
FIG. 13 is a screen shot of a user interface for previewing and accepting content structure changes, according to one illustrated embodiment.

The content management system file services layer 1114 takes those content management domain objects 1112 and creates or updates the actual content structures by connecting into the content management system 102 and making changes. This separation allows the file services layer 1114 to be replaced with a user interface (UI) element 1300 as shown in FIG. 13 that can accept and preview the changes as in the preview area 1302 in the UI element 1300. This is used for running sample baseline synchronizations and testing individual customers.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety, including U.S. Provisional Patent Application No. 61/422,090, filed Dec. 10, 2010. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
receiving information defining entities of an insurance agency management system, the insurance agency management system is specialized to handle a domain of insurance business processes and includes at least one nontransitory processor-readable medium which stores insurance data and information;
receiving content structure that specifies a number of file and folder relationships of a content management system, the content management system is specialized to handle content related to insurance and workflow and includes at least one nontransitory processor-readable medium which stores insurance documents in files and folders, the folders stored in files or stored in other folders;
receiving mapping data indicative of mappings between the entities of the insurance agency management system and the file and folder relationships specified by the content structure of the content management system wherein the entities of the agency management system are each represented by either a file or a folder in the content management system, and each of the entities represented by a folder in the content management system are represented by a respective folder that is in another folder or in a file;

automatically generating a data structure based on the mappings;

storing the file and folder relationships specified by the content structure of the content management system in the data structure corresponding to the mappings; and automatically synchronizing the file and folder relationships of the content management system with changes of the entities of the insurance agency management system, the synchronizing based on information indicative of the changes of the entities of the insurance agency management system.

2. The method of claim 1 wherein the synchronizing comprises:

receiving information indicative of changes of the entities of the insurance agency management system;

automatically comparing at least one of a number of current attributes of the data structure and at least one of a number of current attributes of the file and folder relationships specified by the content structure stored in the data structure; and automatically updating, based on the comparing, at least one of the current attributes of the data structure and the current attributes of the file and folder relationships specified by the content structure stored in the data structure to correspond to the received changes.

3. The method of claim 2 wherein the receiving information indicative of changes of the entities occurs automatically on a periodic or nonperiodic (aperiodic) basis without requesting the information indicative of changes of the entities.

4. The method of claim 2 wherein synchronizing the file and folder relationships of the content management system with changes of the entities of the insurance agency management system occurs at an initial generation of the data structure corresponding to the mappings.

5. The method of claim 1 wherein the automatically generating a data structure based on the mappings comprises generating a hierarchical data structure corresponding to a hierarchical business structure defined by the mapping data.

6. The method of claim 5, further comprising:

after initial generation of the data structure, displaying a number of interactive graphical user interface elements operable to trigger automatically performing at least one of: opening the data structure or one or more files or folders of the content structure for viewing or editing, linking the files and folder relationships specified by the content structure or the data structure to other files and folder relationships specified by the content structures or entities, indexing the files and folders of the content structure or the data structure, or entering at least some of the mapping data.

7. The method of claim 1 wherein the insurance agency management system, after initial generation of the data structure, automatically provides information indicative of changes of the entities upon the changes occurring or on a periodic or nonperiodic (aperiodic) basis and wherein the automatically synchronizing the file and folder relationships of the content management system with changes of the entities of the insurance agency management system comprises:

automatically comparing at least one of a number of current attributes of the data structure and at least one of a number of current attributes of the files and folders of the content structure of the content management system stored in the data structure to the provided information indicative of the changes; and automatically updating, based on the comparing, at least one of the current attributes of the data structure and the current attributes of the files and folders of the content structure of the content management system stored in the data structure to correspond to the provided information indicative of the changes.

8. The method of claim 7 wherein the entities include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity.

9. The method of claim 1 wherein the changes of the entities includes changes to relationships between at least two previously defined ones of the entities, changes to a hierarchical structure defining the entities, or changes to attributes of the entities.

10. The method of claim 1, further comprising:

automatically organizing the file and folder relationships specified by the content structure based on entity criteria including at least one of: insurance business unit, insurance coverage type, agency number, customer line of business, policy type of business, policy type, submission type.

11. A system, comprising:

a computer processor; and a non-transitory memory communicatively coupled to the computer processor having computer-executable instructions stored thereon that when executed by the computer processor cause the computer processor to perform:

receiving information defining entities of an insurance agency management system, the insurance agency management system specialized to handle a domain of insurance business processes and includes at least one non-transitory processor-readable medium which stores insurance data and information;

receiving content structure that specifies a number of file and folder relationships of a content management system, the content management system specialized to handle content related to insurance and workflow and includes at least one nontransitory processor-readable medium which stores insurance documents in files and folders, the folders stored in files or stored in other folders;

receiving mapping data indicative of mappings between the entities of the insurance agency management system and the file and folder relationships specified by the content structure of the content management system wherein the entities of the agency management system are each represented by either a file or a folder in the content management system, and each of the entities represented by a folder in the content management system are represented by a respective folder that is in another folder or in a file;

automatically generating a data structure based on the mappings;

storing the file and folder relationships specified by the content structure of the content management system in the data structure corresponding to the mappings; and automatically synchronizing the file and folder relationships of the content management system with changes of the entities of the insurance agency management system, the synchronizing based on information indicative of the changes of the entities of the insurance agency management system.

12. The system of claim 11 wherein the synchronizing comprises:
receiving information indicative of changes of the entities of the insurance agency management system;
automatically comparing at least one of a number of current attributes of the data structure and at least one of a number of current attributes of the files and folders of the content structure stored in the data structure; and
automatically updating, based on the comparing, at least one of the current attributes of the data structure and the current attributes of the files and folders of the content structure stored in the data structure to correspond to the received changes.

13. The system of claim 12 wherein the receiving information indicative of changes of at least two previously defined ones of the entities occurs automatically on a periodic or aperiodic basis without requesting the information indicative of changes of the entities.

14. The system of claim 12 wherein synchronizing the file and folder relationships of the content management system with changes of the entities of the insurance agency management system occurs at an initial generation of the data structure corresponding to the mappings.

15. The system of claim 11 wherein the automatically generating a data structure based on the mappings comprises generating a hierarchical data structure corresponding to a hierarchical business structure defined by the mapping data.

16. The system of claim 15 wherein the computer-executable instructions, when executed by the computer processor, after initial generation of the data structure, further configure the computer processor to display a number of interactive graphical user interface elements operable to trigger automatically performing at least one of: opening the data structure or the files and folders of the content structure for viewing or editing, linking the files and folders of the content structure or the data structure to other content structures or entities, indexing the files and folders of the content structure or the data structure, or entering at least some of the mapping data.

17. The system of claim 11 wherein the insurance agency management system is configured to, after initial generation of the data structure, automatically provide information indicative of changes of at least two previously defined ones of the entities upon the changes occurring or on a periodic or nonperiodic (aperiodic) basis and wherein the automatically synchronizing the file and folder relationships of the content management system comprises:
automatically comparing at least one of a number of current attributes of the data structure and at least one of a number of current attributes of the files and folders of the content structure stored in the data structure to the provided information indicative of the changes; and
automatically updating, based on the comparing, at least one of the current attributes of the data structure and the current attributes of the files and folders of the content structure stored in the data structure to correspond to the provided information indicative of the changes.

18. The system of claim 17 wherein the entities include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity.

19. The system of claim 11 wherein the changes of the entities includes changes to relationships between at least two previously defined ones of the entities, changes to a hierarchical structure defining the entities, or changes to attributes of the entities.

20. The system of claim 11 wherein the computer-executable instructions, when executed by the computer processor, further configure the computer processor to automatically organize the file and folder relationships specified by the content structure based on entity criteria including at least one of: insurance business unit, insurance coverage type, agency number, customer line of business, policy type of business, policy type, submission type.

21. At least one non-transitory computer-readable medium that stores instructions that when executed by at least one computer system cause the at least one computer system to perform:
receiving information defining entities of an insurance agency management system, the insurance agency management system specialized to handle a domain of insurance business processes and includes at least one non-transitory processor-readable medium which stores insurance data and information;
receiving content structure that specifies a number of file and folder relationships of a content management system, the content management system specialized to handle content related to insurance and workflow and includes at least one nontransitory processor-readable medium which stores insurance documents in files and folders, the folders stored in files or stored in other folders;
receiving mapping data indicative of mappings between the entities of the insurance agency management system and the file and folder relationships specified by the content structure of the content management system wherein the entities of the agency management system are each represented by either a file or a folder in the content management system, and each of the entities represented by a folder in the content management system are represented by a respective folder that is in another folder or in a file;
automatically generating a data structure based on the mappings;
storing the file and folder relationships specified by the content structure of the content management system in the data structure corresponding to the mappings; and
automatically synchronizing the file and folder relationships of the content management system with changes of the entities of the insurance agency management system, the synchronizing based on information indicative of the changes of the entities of the insurance agency management system.

22. The non-transitory computer-readable medium of claim 21 wherein the synchronizing comprises:
receiving information indicative of changes of the entities of the insurance agency management system;
automatically comparing at least one of a number of current attributes of the data structure and at least one of a number of current attributes of the files and folders of the content structure stored in the data structure; and
automatically updating, based on the comparing, at least one of the current attributes of the data structure and the current attributes of the files and folders of the content structure stored in the data structure to correspond to the received changes.

23. The non-transitory computer-readable medium of claim 22 wherein the receiving information indicative of changes of the entities occurs automatically on a periodic basis without requesting the information indicative of changes of the entities.

24. The non-transitory computer-readable medium of claim 22 wherein synchronizing the file and folder relationships of the content management system with changes of the entities of the insurance agency management system occurs at an initial generation of the data structure corresponding to the mappings.

25. The non-transitory computer-readable medium of claim 21 wherein the automatically generating a data structure based on the mappings comprises generating a hierarchical data structure corresponding to a hierarchical business structure defined by the mapping data.

26. The non-transitory computer-readable medium of claim 25 wherein the computer-executable instructions, when executed by the at least one computer system, further cause the at least one computer system to display a number of interactive graphical user interface elements operable to trigger automatically performing at least one of: opening the files and folders of the content structure or the data structure for viewing or editing, linking the files and folders of the content structure or the data structure to other files and folders of the content structures or entities, indexing the content structure or the data structure, or entering at least some of the mapping data.

27. The non-transitory computer-readable medium of claim 21 wherein the computer-executable instructions, when executed by the at least one computer system, further cause the at least one computer system to, after initial generation of the data structure, cause the insurance agency management system to automatically provide information indicative of changes of the entities upon the changes occurring or on a periodic or nonperiodic (aperiodic) basis and wherein the automatically synchronizing the file and folder relationships of the content management system comprises:
   automatically comparing at least one of a number of current attributes of the data structure and at least one of a number of current attributes of the files and folders of the content structure stored in the data structure to the provided information indicative of the changes; and
   automatically updating, based on the comparing, at least one of the current attributes of the data structure and the current attributes of the files and folders of the content structure stored in the data structure to correspond to the provided information indicative of the changes.

28. The non-transitory computer-readable medium of claim 27 wherein the entities include at least one of: an insurance client entity, an insurance submissions entity, an insurance policies entity, an insurance claims entity, an insurance quotes entity, an insurance vendor entity, an insurance company employee entity, an insurance carrier entity, or an insurance transactions entity.

29. The non-transitory computer-readable medium of claim 21 wherein the changes of the entities includes changes to relationships between at least two previously defined ones of the entities, changes to a hierarchical structure defining the entities, or changes to attributes of the entities.

30. The non-transitory computer-readable medium of claim 21 wherein the computer-executable instructions, when executed by the at least one computer system, further cause the at least one computer system to automatically organize the file and folder relationships specified by the content structure based on entity criteria including at least one of: insurance business unit, insurance coverage type, agency number, customer line of business, policy type of business, policy type, submission type.

31. A system, comprising:
at least one computer processor; and
a non-transitory memory communicatively coupled to the computer processor having computer-executable instructions stored thereon that when executed by the computer processor cause the at least one computer processor to:
link entities of an insurance agency management system to file and folder relationships specified by content hierarchical structures of a content management system, the insurance agency management system specialized to handle a domain of insurance business processes and includes at least one nontransitory processor-readable medium which stores insurance data and information, the content management system specialized to handle content related to insurance and workflow and includes at least one nontransitory processor-readable medium which stores insurance documents in files and folders, the folders stored in files or stored in other folders, wherein the entities of the agency management system are each represented by either a file or a folder in the content management system, and each of the entities represented by a folder in the content management system are represented by a respective folder that is in another folder or in a file;
automatically provide information indicative of changes of an insurance agency business unit upon the changes occurring or on a periodic or nonperiodic (aperiodic) basis; and
automatically synchronize the file and folder relationships of a content management system content hierarchical structure related to the insurance agency business unit with the changes to the insurance agency business unit by changing at least one hierarchical relationship in the content hierarchical structure.

32. The system of claim 31 wherein the computer-executable instructions further cause the at least one computer processor to:
automatically compare at least one current attribute of a data structure for the insurance agency business unit of the insurance agency management system to an attribute of content related to the insurance agency business unit stored in the files and folders of the content management system content hierarchical structures.

33. The system of claim 31 wherein the information indicative of changes is automatically provided by the insurance agency management system.

34. The system of claim 31 wherein the computer-executable instructions further cause the at least one computer processor to:
automatically provide information indicative of changes to content of an insurance policy; and
automatically update file and folder relationships specified by the content management system content hierarchical structures based on the information indicative of changes to content of the insurance policy.

35. The system of claim 34 wherein the information indicative of changes to content of the insurance policy is automatically provided by the content management system.

36. The system of claim 31 wherein the computer-executable instructions further cause the at least one computer processor to link the entities of the insurance agency management system to the files and folders of the content hierarchical structures of the content management system as an initial process before any of the information indicative of changes is provided.

37. The system of claim 31 wherein the computer-executable instructions further cause the at least one computer processor to:
- provide a preview of changes to the file and folder relationships specified by the content hierarchical structure;
- provide a testing environment to test the changes to the file and folder relationships specified by the content hierarchical structure changes;
- provide troubleshooting logs resulting from testing of the content hierarchical structure changes; and
- link the entities of the insurance agency management system to file and folder specified by the content hierarchical structures of the content management system by providing multiple mappings between the entities of the insurance agency management system and the files and folders specified by the content hierarchical structures.

38. The system of claim 31 wherein the computer-executable instructions further cause the at least one computer processor to provide an interface for a user to manually trigger a synchronization of the file and folder relationships specified by the content management system content hierarchical structure related to the insurance agency business unit with the changes to the insurance agency business unit.

* * * * *